(12) United States Patent
Hasegawa

(10) Patent No.: US 7,848,849 B2
(45) Date of Patent: Dec. 7, 2010

(54) CONTROLLER OF LEG TYPE MOVING ROBOT

(75) Inventor: Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 928 days.

(21) Appl. No.: 11/575,925

(22) PCT Filed: Jul. 28, 2005

(86) PCT No.: PCT/JP2005/013841

§ 371 (c)(1),
(2), (4) Date: Mar. 23, 2007

(87) PCT Pub. No.: WO2006/040867

PCT Pub. Date: Apr. 20, 2006

(65) Prior Publication Data

US 2008/0065269 A1    Mar. 13, 2008

(30) Foreign Application Priority Data

Oct. 15, 2004   (JP)   ............... 2004-300909

(51) Int. Cl.
  *G05B 19/00* (2006.01)
(52) U.S. Cl. .............. 700/260; 700/261; 700/245; 901/2; 318/568.17; 318/568.18
(58) Field of Classification Search .............. 700/245, 700/260, 261; 901/1, 2, 14; 318/568.1, 568.12, 318/568.17, 568.18
See application file for complete search history.

(56) References Cited

U.S. PATENT DOCUMENTS 6,505,096 B2 *  1/2003  Takenaka et al. ............ 700/245
6,580,969 B1 *  6/2003  Ishida et al. ................ 700/245
6,584,377 B2 *  6/2003  Saijo et al. .................. 700/245

(Continued)

FOREIGN PATENT DOCUMENTS

EP    1 798 004    6/2007

(Continued)

*Primary Examiner*—Thomas G Black
*Assistant Examiner*—Ce Li
(74) *Attorney, Agent, or Firm*—Rankin, Hill & Clark LLP

(57) ABSTRACT

A controller of a leg type moving robot determines an action force to be input to an object dynamic model 2 such that a motion state amount (object model velocity) of the object dynamic model 2 follows a desired motion state amount based on a moving plan of an object, and also determines a manipulated variable of the motion state amount (object model velocity) of the object dynamic model 2 such that the difference between an actual object position and a desired object position approximates zero, and then inputs the determined action force and manipulated variable to the object dynamic model 2 to sequentially determine the desired object position. Further, a desired object reaction force to a robot from the object is determined from the determined reaction force. This arrangement causes the robot to perform an operation of moving an object while securing stability of the robot by determining the desired motion of the object and the desired value of an action force between the object and the robot while minimizing the difference between a motion state of the object on the object dynamic model and an actual motion state.

5 Claims, 22 Drawing Sheets

U.S. PATENT DOCUMENTS

| | | | |
|---|---|---|---|
| 6,832,132 B2 * | 12/2004 | Ishida et al. | 700/245 |
| 6,876,903 B2 * | 4/2005 | Takenaka | 700/245 |
| 7,092,792 B2 * | 8/2006 | Hayashi et al. | 700/254 |
| 7,112,938 B2 * | 9/2006 | Takenaka et al. | 318/568.12 |
| 7,120,518 B2 * | 10/2006 | Takenaka et al. | 700/245 |
| 7,319,918 B2 * | 1/2008 | Takenaka et al. | 700/245 |
| 7,337,039 B2 * | 2/2008 | Takenaka et al. | 700/245 |

FOREIGN PATENT DOCUMENTS

| | | |
|---|---|---|
| JP | 05-324115 | 12/1993 |
| JP | 10-086080 | 4/1998 |
| JP | 10-230485 | 9/1998 |
| JP | 2002-326173 | 11/2002 |
| JP | 2003-326483 | 11/2003 |
| JP | 2004-209614 | 7/2004 |
| WO | 02/40224 | 5/2002 |
| WO | 03/057422 | 7/2003 |
| WO | 03/057427 | 7/2003 |

* cited by examiner

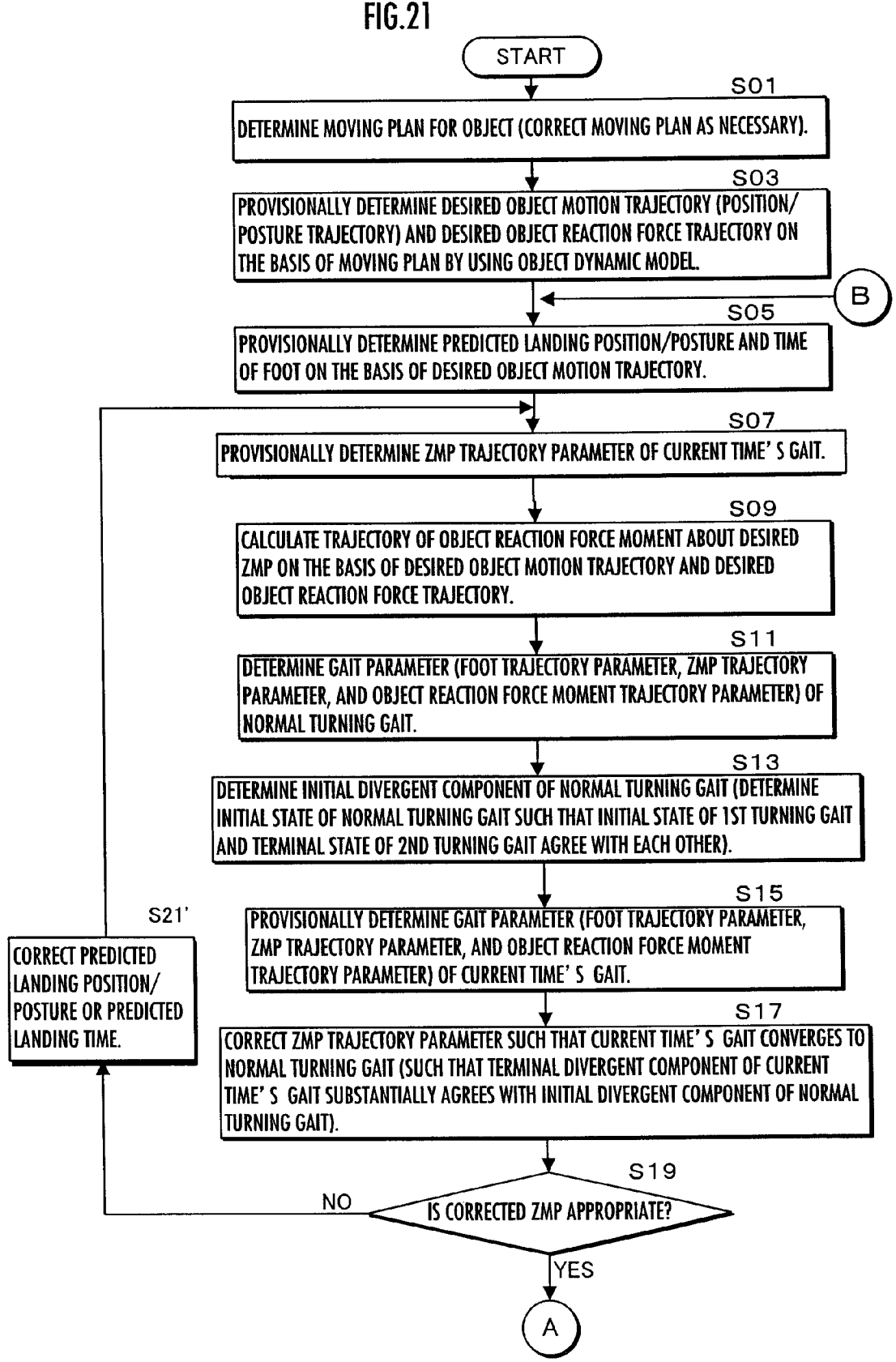

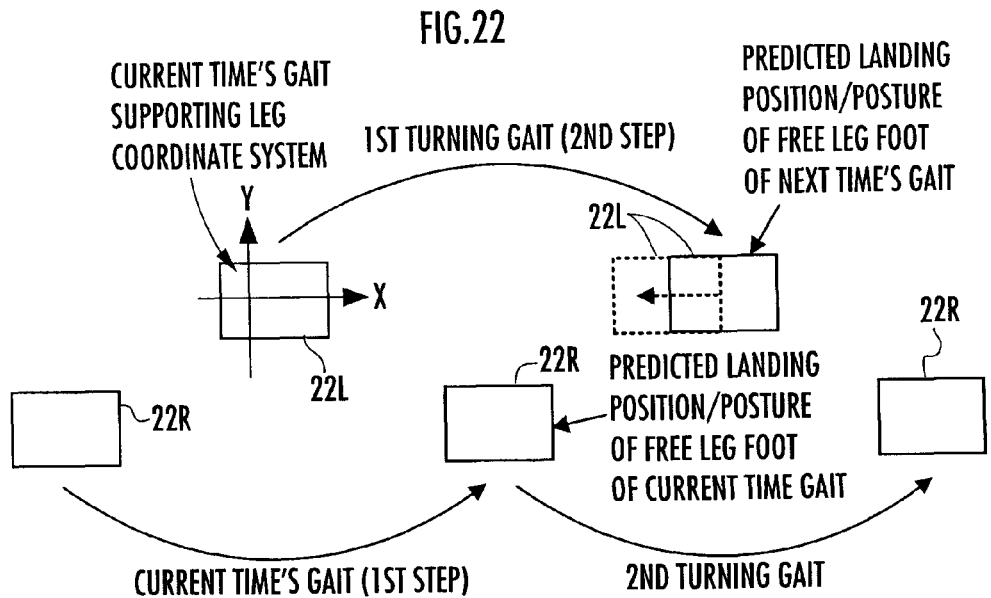
FIG.22
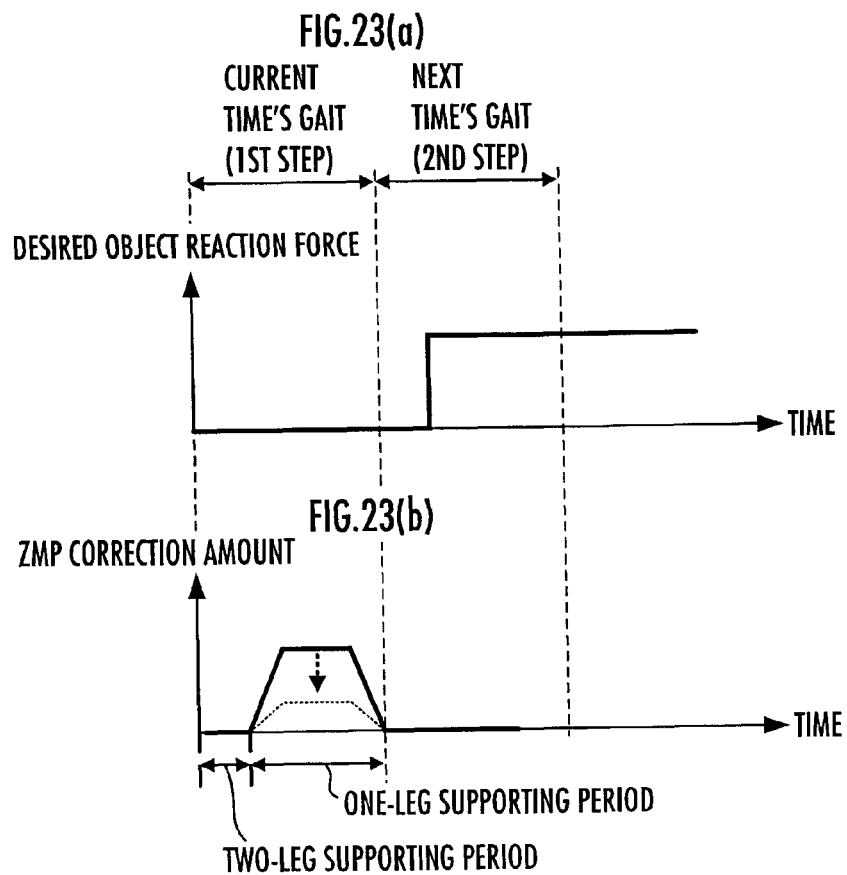
FIG.23(a)
FIG.23(b)

CONTROLLER OF LEG TYPE MOVING ROBOT

TECHNICAL FIELD

The present invention relates to a controller for causing a leg type moving robot to carry out an operation of moving an object.

BACKGROUND ART

When causing a leg type moving robot, such as a bipedal moving robot, to perform an operation of, for example, moving a certain object by pushing, the robot is subjected not only to a floor reaction force from a floor with which a distal portion of a leg thereof is in contact but also to a reaction force from the object. The reaction force received by the robot from the object is referred to as an object reaction force in the present description.

As a technology for generating a gait of a robot or controlling an operation thereof in a state wherein an object reaction force is acting on a leg type moving robot, there has been known a technology disclosed in, for example, Japanese Patent Laid-Open No. H10-230485 by the inventor of the present application (hereinafter referred to as Patent Document 1). According to the technology, a desired gait is generated such that a dynamic balance condition in which a component (horizontal component), excluding a vertical component, of a moment produced about a desired ZMP (a desired floor reaction force central point) by a resultant force of an inertial force produced due to a motion of a robot and the gravity and an object reaction force acting on the robot is zero (a floor reaction force acting on the desired floor reaction force central point and the aforesaid resultant force are balanced with each other) is satisfied. Furthermore, according to the technology, even if an external force acting on the robot turns into an unexpected external force (even if a difference between a desired external force and an actual external force increases to a certain extent), a desired gait of the robot is adjusted such that a position of the center-of-gravity of the robot is balanced to a position of the center-of-gravity that makes it possible to maintain the dynamic balance of the robot.

Meanwhile, in order to cause a robot to perform the operation of moving an object as described above (more specifically, in order to determine a gait of the robot for carrying out the operation and to actuate the robot to follow the gait), it is necessary to determine beforehand a desired value of a force to be applied to the object from the robot or a desired value of the object reaction force. An object reaction force is obtained by reversing the sign of a force which is applied to the object from the robot, so that a desired value of an object reaction force will be representatively determined hereinafter in the explanation of the description.

In this case, the desired value of the object reaction force (hereinafter referred to as "the desired object reaction force") will be determined on the basis of a moving plan of an object (a schedule showing the timings and methods for moving an object) or environmental conditions (e.g., the coefficient of friction between an object and a floor, and the inclination angle of the floor) predicted in advance. Furthermore, in this case, it is also possible to determine the desired object reaction force by applying a motion of the object based on the moving plan of the object to a dynamic model of the object constructed on the basis of the predicted environmental conditions (a model showing a relationship between a motion, including a velocity and a position, of the object and a force acting on the object).

However, actual environmental conditions frequently disagree with predicted environmental conditions. In such a case, there will be a discrepancy between a desired object reaction force and a real object reaction force (actual object reaction force). As a result, even when the operation of the robot is controlled so as to satisfy the dynamic balance condition of the robot on the basis of the desired object reaction force, the discrepancy between the desired object reaction force and the actual object reaction force prevents the dynamic balance condition of the actual robot from being satisfied, thus impairing the stability of the robot.

Hence, according to the aforesaid technology disclosed in Patent Document 1, the position of the center-of-gravity of a robot or the desired value of a floor reaction force is corrected to cancel the difference between a desired object reaction force and an actual object reaction force.

However, in a situation wherein a discrepancy takes place between a desired object reaction force and an actual object reaction force, another discrepancy generally takes place between a moving position of an object based on a moving plan (i.e., a desired moving position of an object) and an actual moving position of the object. In this case, the desired object reaction force will not match the actual moving position of the object. For this reason, as with the aforesaid one in Patent Document 1, even if the position of the center-of-gravity of the robot or the desired value of the floor reaction force is corrected so as to cancel the difference between the desired object reaction force and the actual object reaction force, the discrepancy between the desired object reaction force and the actual object reaction force excessively increases or the discrepancy frequently occurs in some cases. In such a case, there has been a danger in that an excessive behavior change of the robot takes place, thus making it difficult to cause the robot to successively perform the operation of moving the object while continuously maintaining the stability of the robot.

The desired object reaction force could be corrected on the basis of a detected value of the actual object reaction force. However, if, for example, the actual object reaction force suddenly changes and if the desired object reaction force is suddenly changed in response thereto, then the robot develops an excessive behavior change, which could easily impair the stability of the robot. In this case, the desired object reaction force could be slowly changed in response to the change in the actual object reaction force; however, doing so would cause a delay in the change of the desired object reaction force in response to the change of the actual object reaction force. This would prevent the dynamic stability of the robot from being promptly secured, resulting in impaired stability of the robot.

The present invention has been made with a view of the aforesaid background, and it is an object thereof to provide a controller of a leg type moving robot which uses a dynamic model of an object and which is capable of determining a desired motion of the object and a desired value of an action force between the object and the robot by using the dynamic model while minimizing a discrepancy between a motion state of the object on the dynamic model and a motion state of the actual object, thus making it possible to cause the robot to perform an operation of moving the object while securing the stability of the robot.

DISCLOSURE OF INVENTION

To fulfill the aforesaid object, in accordance with a first aspect of the present invention of a controller of a leg type moving robot, a controller for causing a leg type moving robot equipped with a plurality of legs extended from a body thereof to perform an operation of moving an object includes:

a desired motion state amount determining means which sequentially determines a desired motion state amount, which is a desired value of a motion state amount of an object on an object dynamic model showing a relationship between a force acting on the object and a motion of the object, on the basis of at least a moving plan of the object;

a desired action force determining means which sequentially determines a desired action force between the robot and the object, which is a desired value of a force acting between the robot and the object, such that the motion state amount of the object on the object dynamic model follows at least the determined desired motion state amount;

a desired moving position determining means which sequentially determines a desired moving position of the object as an output of the dynamic model by inputting the determined desired action force between the robot and the object into the object dynamic model;

a controlling means which controls an operation of the robot on the basis of at least the determined desired action force between the robot and the object and the determined desired moving position;

an actual moving position grasping means which grasps an actual moving position, which is a real moving position of the object; and a motion manipulated variable determining means which determines a motion manipulated variable of an object on the object dynamic model on the basis of a difference between the grasped actual moving position and the determined desired moving position such that the difference approximates zero, wherein the desired moving position determining means determines the desired moving position while correcting the motion state amount of the object on the object dynamic model on the basis of the determined motion manipulated variable.

According to the first aspect of the invention described above, the desired action force between the robot and the object is determined such that the motion state amount of the object on the object dynamic model follows the desired motion state amount (e.g., the desired velocity of the object) determined on the basis of the moving plan of the object (the schedule showing the timings and methods for moving the object), and the determined desired action force is supplied to the object dynamic model. The force acting between the robot and the object includes a force acting on the object from the robot and a force acting onto the robot from the object, but they differ only in sign (the direction of force), so that the desired value of either of the forces may be defined as the desired action force between the robot and the object. And, the desired moving position determining means determines the desired moving position of the object while correcting the motion state amount of the object on the object dynamic model on the basis of a motion manipulated variable determined such that the difference between the actual moving position and the desired moving position approximates zero. This makes it possible to determine the desired moving position of the object and the desired action force between the robot and the object by using the dynamic model while minimizing the discrepancy between the motion state of the object on the object dynamic model and the motion state of the actual object. Furthermore, the present invention controls an operation of the robot on the basis of the desired position of the object and the desired action force between the robot and the object, thus making it possible to cause the robot to perform the operation of moving the object without causing the robot to perform an unreasonable operation, which may lead to a sudden change of a behavior of the robot. As a result, it is possible to cause the robot to perform the operation of moving the object while securing the stability of the robot.

When controlling a motion of the robot on the basis of a desired position of the object and a desired action force between the robot and the object, the landing position or a landing timing of a leg and the position of a portion of the robot to be engaged with the object may be determined on the basis of, for example, the desired position of the object, and a desired gait of the robot may be determined such that the horizontal component of a moment generated about a desired ZMP of the robot by the resultant force of an inertial force produced by a motion of the robot, a gravity acting on the robot, and a desired action force between the robot and the object (more specifically, a desired value of a force acting on the robot from the object) becomes zero, and the motion of the robot may be controlled so as to follow the desired gait.

The first aspect of the invention described above preferably includes a disturbance force estimating means which sequentially estimates a disturbance force other than a force acting on the object from the robot in a force acting on the object, and a moving plan correcting means which corrects the moving plan on the basis of a change in the estimated disturbance force (a second aspect of the invention).

More specifically, an unexpected change in the disturbance force not predicted in the moving plan of the object tends to cause a discrepancy between an actual moving position and a desired moving position of the object; however, it is possible to prevent the discrepancy between the actual moving position and the desired moving position of the object from becoming excessive when a considerable change in disturbance force occurs (in a case where an estimated change amount of a disturbance force exceeds a predetermined amount) by sequentially estimating the disturbance force and correcting the moving plan in response to the change in the disturbance force. As a result, it is possible to prevent a desired action force between the robot and the object from becoming excessive and therefore to enhance the stability of the robot.

Further, preferably, the first aspect of the invention described above includes a disturbance force estimating means which sequentially estimates a disturbance force other than a force acting on the object from the robot in a force acting on the object, and the desired motion state amount determining means determines the desired motion state amount on the basis of at least the moving plan and the estimated disturbance force (a third aspect of the invention).

With this arrangement, a desired motion state amount of the object is determined while observing a change in a disturbance force other than a force applied from the robot (e.g., a frictional force acting on the object from a floor) among the forces actually applied to the object, thus allowing a proper desired motion state amount to be determined for moving the object according to the moving plan. Moreover, the desired action force between the robot and the object is determined such that the motion state amount of the object on the object dynamic model follows the desired motion state amount, so that the desired action force between the robot and the object can be changed in response to a change in an actual disturbance force. This permits enhanced stability of behaviors of the robot to be achieved.

The third aspect of the invention may be combined with the second aspect of the invention described above. In this case, the disturbance force estimating means in the third aspect of the invention and the disturbance force estimating means in the second aspect of the invention may be the same.

Supplementally, to determine the desired motion state amount in the third aspect of the invention described above, the provisional desired value of the action force between the robot and the object may be determined on the basis of, for example, the moving plan of the object, and the desired motion state amount may be determined using a second object dynamic model (a second dynamic model showing a relationship between a force acting on the object and a motion of the object) from the aforesaid provisional desired value and the aforesaid estimated disturbance force. In this case, the provisional desired value of the action force between the robot and the object may be determined such that the motion state amount of the object on the aforesaid second object dynamic model follows a motion state amount of the object (e.g., a moving velocity of the object) defined by the moving plan.

Further, in the second aspect of the invention and the third aspect of the invention described above, the disturbance force estimating means is preferably a means for estimating the disturbance force on the basis of the determined desired action force between the robot and the object mentioned above and the moving velocity of the object on the object dynamic model (a fourth aspect of the invention).

More specifically, according to the present invention, the difference between an actual moving position and a desired moving position of the object can be minimized, so that the moving velocity of the object on the object dynamic model will correspond to an estimated value of the moving velocity of the actual object. Furthermore, a temporal change amount of the moving velocity will be based on the resultant force of all forces applied to the object (the resultant force of a force applied to the object from the robot and a disturbance force), so that the aforesaid disturbance force can be estimated on the basis of the moving velocity of the object on the object dynamic model. Thus, disturbance forces can be properly estimated by estimating the disturbance forces as described above, obviating the need for installing a sensor, such as a force sensor, on an object.

To estimate a disturbance force in the fourth invention, more specifically, for example, a value that follows the product of a differential value of a moving velocity of the object on the object dynamic model and the mass of the object (e.g., a value that follows the product with a primary delay) may be defined as the estimated value of the resultant force of all forces acting on the object, and the result obtained by subtracting a desired action force applied to the object from the robot, which is determined by the desired action force between the robot and the object supplied to the object dynamic model, from the estimated value of the resultant force may be determined as the estimated value of the disturbance force.

BEST MODE FOR CARRYING OUT THE INVENTION

The following will explain a controller of a leg type moving robot according to embodiments of the present invention with reference to the accompanying drawings. A bipedal moving robot will be taken as an example of a leg type moving robot.

FIG. 1 is a schematic diagram providing a general view of a bipedal moving robot as a leg type moving robot according to an embodiment.

As shown in the figure, a bipedal moving robot (hereinafter referred to as "the robot") 1 is equipped with a pair of right and left legs (leg links) 2, 2 extended downward from a body (a base body of the robot 1) 3. The two legs 2, 2 share the same construction, each having six joints. The six joints are composed of, in the following order from the body 3 side, joints 10R, 10L (the symbols R and L are the symbols which means that they correspond to the right leg and the left leg, respectively, the same being applied hereinafter) for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2, and the body 3 is installed at the uppermost top of the two legs 2, 2 through the intermediary of the three joints 10R(L), 12R(L) and 14R(L) of the hip of each leg 2. A control unit 60 and the like, which will be discussed in detail hereinafter, is housed in the body 3. For the sake of convenience of illustration, the control unit 60 is shown outside the body 3 in FIG. 1.

In each leg 2 having the aforesaid construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arms (arm links) 5, 5 is attached to both sides of an upper portion of the body 3, and a head 4 is disposed at a top end of the body 3. Both arms 5, 5 share the same construction, each of them having seven joints. More specifically, each arm 5 is provided with a shoulder joint composed of three joints 30R(L), 32R(L), and 34R(L), an elbow joint composed of a joint 36R(L), a wrist joint composed of three joints, namely, 38R(L), 40R(L) and 42R(L), and a hand 40R(L) connected to the wrist joint. The head 4 is not directly associated with the topic of the present invention, so that detailed explanation thereof will be omitted.

The construction described above imparts six degrees of freedom to the foot 22R(L) of each leg 2 relative to the body 3. During a travel, such as walking, of the robot 1, desired motions of the two feet 22R and 22L can be accomplished by driving 6*2=12 joints of the two legs 2, 2 together ("*" in this description denotes multiplication for scalar calculation, while it denotes an outer product in vector calculation) at appropriate angles. This arrangement enables the robot 1 to arbitrarily move in a three-dimensional space. Furthermore, each arm 5 is given seven degrees of freedom relative to the body 3 and capable of performing a desired operation, such as pushing a carriage, which will be discussed later, by driving 7*2=14 joints of the two arms 5, 5 together at appropriate angles.

As shown in FIG. 1, a publicly known six-axis force sensor 50 is provided under the ankle joints 18R(L), 20R(L) and between the ankle joints and the foot 22R(L) of each leg 2. The six-axis force sensor 50 detects primarily whether the foot 22R(L) of each leg 2 is in contact with the ground and a floor reaction force (ground contact load) acting on each leg 2, and it outputs detection signals of components in three directions Fx, Fy and Fz of a translational force of the floor reaction force and components in three directions Mx, My and Mz of a moment to the control unit 60. A six-axis force sensor 52 similar to the six-axis force sensor 50 is provided between the hand portion (hand) 44R(L) of each arm 5 and the wrist joints 38R(L), 40R(L), and 42R(L), and detection signals of components in three directions of a translational force and components in three directions of a moment of an external force acting on the hand portion 44R(L) are output from the six-axis force sensor 52 to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis-direction accelerometer and a three-axis-direction gyro sensor, which are not shown, and the detection signals of these sensors are used to detect posture angles (inclination angles and yaw angles) of the body 3 and angular velocities thereof and also to estimate its own position/posture of the robot 1. Although detailed structures are not shown, each joint of the robot 1 is provided with an electric motor 64 (refer to FIG. 2) for driving the joint and an encoder (rotary encoder) 65 (refer to FIG. 2) for detecting a rotational amount of the electric motor 64 (a rotational angle of each joint). Detection signals of the encoder 65 are output from the encoder 65 to the control unit 60.

Furthermore, although not shown, an elastic member, such as a spring, is installed between the foot 22R(L) and the six-axis force sensor 50, and an elastic member, such as rubber, is bonded to the bottom surface of the foot 22R(L). These elastic members constitute a compliance mechanism, which elastically deforms when each leg 2 is subjected to a floor reaction force.

FIG. 2 is a block diagram showing the construction of the control unit 60. The control unit 60 is composed of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the six-axis force sensor 52 of each arm 5, the posture sensor 54 (an accelerometer and a rate gyro sensor), etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates a desired gait, calculates a joint angle displacement command (a command value of a displacement angle of each joint or a rotational angle of each electric motor 64), and sends the calculated command to the RAM 84. The second calculator 92 reads the joint angle displacement command from the RAM 84 and an actual measurement value of a joint angle detected on the basis of an output signal of the encoder 65 to calculate a manipulated variable required for driving each joint and outputs the calculated manipulated variable to the electric motor 64 for driving each joint through the intermediary of the D/A converter 96 and a servo amplifier 64a.

FIG. 3 is a block diagram providing a general view of the functional construction of a control device of a legged moving robot according to an embodiment in the present description. A portion enclosed by the dashed line in this FIG. 3 is constituted of the processing functions (primarily the functions of the first calculator 90 and the second calculator 92) implemented by the control unit 60. In the following explanation, the symbols R and L will be omitted when it is not particularly necessary to discriminate right and left of the legs 2 and the arms 5.

The following will explain the functional construction of the control unit 60, which is composed of a gait generator 100, an object reaction force balance controller 102, a leg main controller 104, and an arm main controller 106. In the embodiments in this description, the processing by the object reaction force balance controller 102, the leg main controller 104, and the arm main controller 106, excluding the processing by the gait generator 100, is the same as the one previously proposed by the present applicant in Japanese Patent Laid-Open No. H10-230485 (Patent Document 1 mentioned above). Hence, in the following explanation of the embodiment, the explanation will center around the gait generator 100, while the explanation of the object reaction force balance controller 102, the leg main controller 104, and the arm main controller 106 will be simply a schematic explanation.

The gait generator 100 generates a desired gait of the robot 1 freely and in real time and outputs the desired gait. A desired gait output by the gait generator 100 is composed of a desired body position/posture trajectory (a desired position trajectory and a desired posture trajectory of the body 3), a desired foot position/posture trajectory (a desired position trajectory and a desired posture trajectory of each foot 22), a desired hand position/posture trajectory (a desired position trajectory and a desired posture trajectory of the hand 44 of each arm 5), a desired total floor reaction force central point trajectory (the trajectory of a desired position of a total floor reaction force central point), a desired total floor reaction force trajectory, and a desired object reaction force trajectory. If a portion that can be moved relative to the body 3 is provided in addition to the legs 2 and the arms 5, then a desired position/posture trajectory of the movable portion is added to a desired gait. In the following explanation, the "desired" will be frequently omitted unless there is a danger of misunderstanding.

Here, the meanings and definitions of terms related to desired gaits generated by the gait generator 100 will be explained. The "trajectory" in a gait means a temporal change pattern (time series pattern).

The "position" of each portion of the robot 1, such as a foot position or a body position, means the position of a certain representative point fixedly set on the portion. For example, in the present embodiment, the representative point of each foot 22 is the point at which a perpendicular line extended from the center of the ankle joint of the leg 2 provided with the foot 22 down to the bottom surface of the foot 22 intersects with the bottom surface, and the position of the representative point is the foot position. Further, a "posture" means a spatial orientation. For example, a body posture is represented by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis), and a foot posture is represented by means of a two-axis spatial azimuth fixedly set on each foot 22.

Components of a gait other than the components related to a floor reaction force and an object reaction force, i.e., a gait related to a motion of the robot 1, such as foot position/posture or body position/posture, will be generically referred to as "motion." A motion trajectory may be constant (temporally unchanging) or substantially constant. For instance, if the robot 1 is maintained in a state wherein both feet 22 and 22 thereof have been landed and remain stationary, then the foot position/posture trajectory will be constant.

An object reaction force in a gait means a reaction force of a force applied to an object from the robot 1 (a force applied to the robot 1 from the object) when causing the robot 1 to move the object. Thus, a desired object reaction force trajectory corresponds to a trajectory of a desired action force between the robot and the object in the present invention. In the embodiments in the present description, an explanation will be given, taking, as an example, a case where the robot 1 carries out an operation of pushing an object 120 while walking with the hands 44R, 44L of both arms 5, 5 engaged with predetermined portions of the object 120 (a carriage in the illustrated example) as shown in, for example, FIG. 4. The force which the robot 1 receives from the object 120 is an object reaction force. An object reaction force is generally formed of a translational force component and a moment component. However, in the embodiments in the present description, the object reaction force will mean a translational fore acting on the robot 1 from the object 120, and a moment about a certain point acting on the robot 1 due to the translational force is referred to as an object reaction force moment. Supplementally, an object reaction force is a force to be applied to the object 120 from the robot 1, the sign (direction) of which being reversed; therefore, an action force applied to the object 120 from the robot 1 may be used in place of an object reaction force.

In the present description, regarding a motion of the object 120, a position of the object 120 means a position of a representative point fixedly set on the object 120, as with a foot position or the like of the robot 1. Further, a posture of the object 120 means a spatial orientation of the object 120, as with a posture or the like of the foot 22 of the robot 1. And, a position and a posture of the object 120 may be generically referred to as an object motion.

Further, a floor reaction force (a floor reaction force composed of a translational force and a moment) acting on each foot 22 is referred to as "the floor reaction force of each foot" and a resultant force of "the floor reaction force of each foot" of all (two) feet 22R and 22L of the robot 1 is referred to as "the total floor reaction force." In the following explanation, however, each foot floor reaction force will be hardly referred to, so that "the floor reaction force" will be handled as synonymous with "the total floor reaction force," unless otherwise specified.

A desired floor reaction force is generally expressed by a point of action and a translational force and a moment acting on the point. The point of action may be set at any point, so that there are countless conceivable expressions for the same desire floor reaction force. If a desired floor reaction force is expressed by taking a desired floor reaction force central point (a desired position of the central point of a total floor reaction force), in particular, as the point of action, then the moment component of the desired floor reaction force will be zero, excluding a vertical component (the moment about the vertical axis (Z-axis)). In other words, the horizontal component (the moment about the horizontal axis (the X-axis and a Y-axis)) of the moment of the desired floor reaction force about the desired floor reaction force central point will be zero. Hence, in the embodiments in the present description, the gait generator 100 performs generation, taking the desired floor reaction force central point as the point of action of the desired total floor reaction force. Incidentally, the desired floor reaction force central point has the meaning as the point of action of the desired total floor reaction force, so that it may be said to be a component of the desired total floor reaction force in the basic sense. In the embodiments in the present description, however, a desired floor reaction force central point in a desired floor reaction force is closely related to the operation control of the robot 1, so that, in FIG. 3, therefore, the desired floor reaction force central point, which is the point of action in the desired total floor reaction force, is shown separately from the desired total floor reaction force.

In the present description, ZMP (zero moment point) is used to mean a point at which the moment acting about the point due to a resultant force (or a floor reaction force that balances out the resultant force) of an inertial force produced by a motion of the robot and the gravity and an object reaction force acting on the robot is zero, excluding the vertical component thereof. In a gait that satisfies a dynamic balance condition, the ZMP calculated from a desired motion trajectory of the robot, the gravity, and a desired object reaction force agrees with a desired floor reaction force central point. In the present description, a desired ZMP is used instead of a desired floor reaction force central point in many cases.

Further, in the present description, a desired gait means a set of a desired motion, a desired floor reaction force (including a desired ZMP), and a desired object reaction force for a predetermined period. Especially, in the present embodiment, a desired gait (including a case where the desired gait is referred to simply as a gait) will mean a set of a desired motion, a desired floor reaction force (including a desired ZMP), and a desired object reaction force for the period of one step of the robot 1 unless otherwise specified. In this case, "one step" of a desired gait is used to mean the period from the instant when one leg 2 of the robot 1 lands to the instant when the other leg 2 lands. A series of gaits is formed of several gaits in connection (gaits for a predetermined period). In the explanation given hereinafter, a desired gait for one-step period may be referred to as a unit gait. Further, a one-step period in a state wherein the robot 1 is not traveling (a state wherein the contact of both feet 22 and 22 with the ground is maintained) means a certain predetermined period (a period corresponding to a one-step period in a case where the robot 1 travels).

A two-leg supporting period in a gait refers to a period during which the robot 1 supports its own weight by both legs 2, 2 (a period during which both legs 2, 2 are supporting legs), and a one-leg supporting period refers to a period during which the robot 1 supports its own weight only by one leg 2 (a period during which only one leg 2 is a supporting leg). In other words, a desired gait (unit gait) in the present embodiment is a desired gait for a period from the instant when a two-leg supporting period begins to the instant when a one-leg supporting period ends. The leg 2 that supports the self-weight of the robot 1 is called a supporting leg. Both legs 2, 2 become the supporting legs in the two-leg supporting period, while one leg 2 becomes the supporting leg in the one-leg supporting period. Further, in the one-leg supporting period, the leg 2 not supporting the self-weight of the robot 1 (the leg 2 that is not a supporting leg) is called a free leg. In the explanation to be given hereinafter, a supporting leg in a desired gait will mean the leg 2 that lands at the beginning of the two-leg supporting period (the leg 2 that becomes a supporting leg in the one-leg supporting period following the two-leg supporting period) unless otherwise specified. Further, the foot 22 of the leg 2 on the supporting leg side and the foot 22 of the leg 2 on the free leg side will be referred to as the supporting leg foot 22 and the free leg foot 22, respectively. In addition, even in a state wherein the robot 1 does not travel (a state wherein the contact of both feet 22, 22 with the ground is maintained), one leg 2 is a supporting leg, and the other leg 2 is a free leg.

Further, a desired gait (unit gait) to be newly generated by the gait generator 100 or a desired gait (unit gait) that is being generated is called a current time's gait, a desired gait that is one step before the current time's gait is called a last time's gait, a desired gait that is one step following the current time's gait is called a next time's gait, and the further next desired gait is called the next but one time's gait.

A desired gait is described by means of a supporting leg coordinate system as a global coordinate system. In the present embodiment, the supporting leg coordinate system is a global coordinate system (a coordinate system fixed to a floor) in which the point at which a perpendicular line extended to a floor surface from the center of the ankle joints 18 and 20 of the supporting leg intersects with the floor surface in a state wherein substantially the entire bottom surface of the supporting leg foot 22 is in contact (close contact) with the floor surface (this point agreeing with the representative point of the foot 22 in a state wherein substantially the entire bottom surface of the supporting leg foot 22 is in contact with the floor surface in examples of the embodiments in the present description) while the supporting leg foot 22 is in a horizontal posture (more generally, a posture parallel to the floor surface) is defined as the origin, and a horizontal plane that passes the origin is defined as an XY plane. In this case, the X-axis and the Y-axis direction indicate the longitudinal direction and the lateral direction, respectively, of the supporting leg foot 22. In the following explanation, the X-axis, the Y-axis, and the Z-axis mean three axes of the supporting leg coordinate system unless otherwise specified. The origin of the supporting leg coordinate system does not necessarily have to agree with the representative point of the foot 22 in the state wherein substantially the entire bottom surface of the supporting leg foot 22 is in contact with the floor surface, and it may alternatively be set at a point on the floor surface that is different from the representative point.

The matters explained above apply not only to a first embodiment to be explained below but also apply to all embodiments explained in the present description.

First Embodiment

The following will explain in detail a gait generator 100 according to a first embodiment of the present invention. FIG. 5 to FIG. 7 are flowcharts showing the processing by the gait generator 100. The first embodiment is an embodiment of the first aspect, the third aspect, and the fourth aspect of the present invention.

The gait generator 100 sequentially carries out the processing shown in the flowcharts of FIG. 5 to FIG. 7 at a predetermined calculation processing cycle.

First, in S01, a moving plan for an object 120 is determined. The moving plan to be determined here includes at least a moving plan for the object 120 for a predetermined future period (for a plurality of steps of the robot 1) from the current time. The moving plan is decided basically according to a moving requirement of the object 120 (a design requirement on a method and timing for moving the object 120), and it is constituted of a position/posture trajectory (a time series of position and posture) of the object 120 or a parameter or a function or the like that defines the trajectory. For instance, if a moving requirement for the object 120 is to move the object 120 at a constant velocity in the X-axis direction at certain time t0, then the moving plan is decided as illustrated by a graph g1 of FIG. 8. The graph g1 shows time-dependent changes of an object position (a position in the X-axis direction) in the moving plan. In this case, for instance, the time series of the position of the object 120 at each time (time at each certain time interval) after the current time may be decided as the moving plan, or time t0 and the inclination of the graph g1 (moving velocity of the object 120) may be decided as the elements (the parameters) that define the moving plan, or a function expression of the graph g1 may be decided as the element (the parameter) that defines the moving plan. Incidentally, the moving requirement is supplied to the gait generator 100 from outside, as necessary, or stored and retained in a storage means, which is not shown, of the control unit 60 beforehand.

Supplementally, the moving plan decided in S01 is not necessarily decided according to a moving requirement; it is corrected as appropriate when necessary, which will be discussed hereinafter.

The procedure then proceeds to S03 wherein a desired object motion trajectory (a desired object position/posture trajectory) and a desired object reaction force trajectory are provisionally determined using an object dynamic model on the basis of the moving plan decided in S01 as described above.

Now, the processing of this S03 and the object dynamic model used in the processing will be explained with reference to the block diagram of FIG. 9. FIG. 9 is the block diagram showing the calculation processing for determining a desired object position trajectory and a desired object reaction force trajectory of a desired object motion trajectory in S03. The portion enclosed by the dashed line in the block diagram provides the object dynamic model showing a relationship between forces acting on the object 120 and motions of the object 120. In the present embodiment, for the convenience of understanding, the explanation will be given by taking, as an example, a case where the object 120 is moved on a substantially horizontal floor.

The object dynamic model shown in FIG. 9 is a dynamic model that receives a force (more specifically, a translational force in the horizontal direction) to be applied to the object 120 as an input, and outputs a position of the object 120. To be more specific, the object dynamic model determines a motional acceleration of the object 120 by multiplying an input value of a translational force in the horizontal direction to be applied to the object 120 (the value determined by an adder 204, which will be discussed later) by a reciprocal 1/M of a mass M of the object 120 by a multiplier 206, then the obtained result is sequentially integrated (double-integrated) by integrators 208 and 210 thereby to output a position of the object 120 (a position on the object dynamic model). In other words, in the present embodiment, the object dynamic model shown in FIG. 9 is constructed on the basis of a dynamic equation that a translational force acting on the object 120 is equal to a product of an acceleration and a mass of the object 120. An output of the integrator 208 means a moving velocity of the object 120 on the object dynamic model and this will be hereinafter referred to as an object model velocity.

The calculation processing in S03 that uses such an object dynamic model will be specifically explained with reference to FIG. 9. First, a desired object velocity, which is a desired velocity at each instant (at each time) of the object 120 based on the moving plan determined in S01 described above, and the object model velocity previously determined by the integrator 208 are input to a subtractor 200, which determines a difference therebetween (=the desired object velocity−the object model velocity). Here, the desired object velocity is a value obtained as a first-order differential value of a position trajectory of the object 120 in the moving plan or a component of the moving plan. In the example of the moving plan shown in FIG. 8 described above, the inclination of the graph g1 may be directly used as the desired object velocity, and in this case, the desired object velocity will continually take a constant value. Then, the time series of the desired object velocity for a predetermined future period (for a plurality of steps of the robot 1) from the current time is sequentially input to the subtractor 200. The object model velocity input to the subtractor 200 is the value output from the integrator 208 when a desired object velocity immediately preceding the desired object velocity to be newly input is supplied to the subtractor 200.

Subsequently, the difference is multiplied by a predetermined gain Kv by a multiplier 202 to determine a required value of a translational force that should be applied to the object 120 from the robot 1. This means that, in the present embodiment, the required value of the translational force is determined by a feed-back control law such that the difference between the desired object velocity and the object model velocity converges to zero (such that the object model velocity follows the desired object velocity). As the feed-back control law, a proportional control law is used in this example. Then, a time series of the result obtained by reversing the sign of the determined required value of the translational force is output as a desired object reaction force trajectory.

Further, the determined required value of the translational force and an estimated disturbance force, which is an estimated value of a disturbance force applied to the object 120 from a source other than the robot 1 (e.g., a frictional force acting on the object 120 from a floor), are supplied to the adder 204, and the sum of the required value of the translational force and the estimated disturbance force is determined by the adder 204 as an input value of the translational force for the object dynamic model. Here, the estimated disturbance force is determined by the processing in S35, which will be described later, for each calculation processing cycle of the gait generator 100. As an estimated disturbance force to be input to the adder 120, the value determined at the previous calculation processing cycle of the gait generator 100 is used. Then, the input value of the translational force determined as described above is supplied to the object dynamic model so as to determine the position of the object 120 as described above, and the time series of the determined position is output from the integrator 210 as a desired object position trajectory.

An initial value of an output of the integrator 208 of the object dynamic model is set to a value at time associated with a previous calculation processing cycle (the current time at the previous calculation processing cycle) in the time series of an object model velocity determined by carrying out the processing of S03 at the previous calculation processing cycle of the gait generator 100. Further, an initial value of an output of the integrator 210 is set to a value at time associated with a previous calculation processing cycle (the current time at the previous calculation processing cycle) in the time series of a desired object position determined by carrying out the processing of S03 at the previous calculation processing cycle of the gait generator 100.

A desired object posture trajectory in a desired object motion trajectory is determined such that, for example, it substantially agrees with the direction of a desired object velocity.

Supplementally, as long as a moving plan and an estimated disturbance force are maintained to be constant, a desired object motion trajectory and a desired object reaction force trajectory remain to be constant; therefore, the processing in S03 does not necessarily have to be implemented at each calculation processing cycle of the gait generator 100. Hence, for example, the processing in S03 may be carried out at each step of the robot 1 or at each more than one calculation processing cycle of the gait generator 100, or when a moving plan has been changed in S01 or if an estimated disturbance force has incurred a relatively significant change.

By the processing in S03 explained above, a desired object motion trajectory and a desired object reaction force trajectory for a predetermined future period from the current time are provisionally determined.

The object dynamic model used in the processing of S03 is not the object dynamic model in the present invention. The one corresponding to the object dynamic model in the present invention is an object dynamic model 2, which will be discussed later.

Subsequently, the procedure proceeds to S05 wherein predicted landing positions/postures and predicted landing time of the free leg foot 22 of the robot 1 are provisionally determined on the basis of the desired object motion trajectory provisionally determined as described above. The predicted landing positions/postures and the predicted landing time provisionally determined here are the predicted landing positions/postures and the predicted landing time of the free leg foot 22 for a plurality of steps (for at least two steps) of the robot 1, including the predicted landing position/posture and the predicted landing time of the free leg foot 22 in the current time's gait, which is the desired gait to be created now. In other words, the predicted landing position/posture and the predicted landing time to be provisionally determined include at least the predicted landing position/posture and the predicted landing time of the free leg foot 22 for the current time's gait and the predicted landing position/posture and the predicted landing time of the free leg foot 22 for the next time's gait. In this case, the predicted landing position/posture and the predicted landing time of the free leg foot 22 are determined such that the landing position/posture of the free leg foot 22 at predicted landing time has a predetermined relative position/posture relationship with the object position/posture at that time in relation to the desired object motion trajectory determined in S03.

However, the predicted landing position/posture and the predicted landing time of the free leg foot 22 do not have to be necessarily determined such that they follow desired object position/posture. For example, if the object 120 is moved by pushing in a state wherein the robot 1 does not travel (a state wherein the contact of both feet 22, 22 with the ground is maintained), and after the movement is started, the hands 44 of the arms 5, 5 are disengaged from the object 120, then the predicted landing position/posture of the free leg foot 22 in each gait will be maintained to be constant as time elapses. In other words, the predicted landing position/posture and the predicted landing time of the free leg foot 22 are generally determined not only on the basis of a desired object motion trajectory but also a design requirement on the type of motion of the robot 1 to move the object 120.

More detailedly, the predicted landing position/posture of the free leg foot 22 are the position/posture of the free leg foot 22 in a state wherein substantially the entire bottom surface of the free leg foot 22 is brought into contact with a floor surface by landing the heel of the free leg foot 22 and rotating the foot in the pitch direction without slippage while the free leg foot 22 is held in contact with the floor. Hence, in the present embodiment, the predicted landing position/posture of the free leg foot 22R or 22L define the position/posture on a supporting leg coordinate system in a unit gait from the landing instant thereof to the landing of the next free leg foot 22L or 22R. Thus, determining the predicted landing position/posture of the free leg foot 22 accordingly determines the position/posture on the supporting leg coordinate system in each unit gait according to the technique for setting the supporting leg coordinate system described above. Specifically, the supporting leg coordinate system in each unit gait will be a coordinate system in which the origin thereof is the point at which a perpendicular line extended from the center of the ankle joint of the leg 2 having the foot 22 to a floor surface intersects with the floor surface in a state wherein the free leg foot 22 of a unit gait immediately preceding the aforesaid unit gait has been matched to the predicted landing position/posture.

Subsequently, the procedure proceeds to S07 wherein a ZMP trajectory parameter that defines a desired ZMP trajectory of the current time's gait is provisionally determined. The ZMP trajectory parameter provisionally determined here is determined such that the desired ZMP (hereinafter referred to as the provisional desired ZMP) of the current time's gait defined thereby exists substantially around the center of a ground contact plane of the supporting leg foot 22 in the current time's gait (a so-called supporting polygon that includes the ground contact plane of both feet 22 in a two-leg supporting period) that is determined by the predicted landing position/posture and the predicted landing time provisionally determined in S05 and that the desired ZMP does not suddenly change. In other words, the ZMP trajectory parameter is determined such that the provisional desired ZMP in the current time's gait exists at a position where the stability allowance of the robot 1 is maximized within the ground contact plane (or the supporting polygon) of the robot 1 and that the provisional desired ZMP does not suddenly change. The provisional desired ZMP determined according to such guidelines exhibits, for example, a pattern as shown in FIG. 10(*a*). FIG. 10(*a*) shows the pattern of the position of the provisional desired ZMP in the X-axis direction. In the case of this example, the positions and the times of the break points in the provisional desired ZMP pattern (trajectory) are provisionally determined as ZMP trajectory parameters.

Subsequently, the procedure proceeds to S09 wherein the trajectory of an object reaction force moment (the time series of instantaneous values of an object reaction force moment) about the provisional desired ZMP determined by the currently provisionally determined ZMP trajectory parameters is calculated on the basis of the desired object motion trajectory and the desired object reaction force trajectory that are currently provisionally determined. More specifically, first, the motion trajectories (position/posture trajectories) of portions of the object 120 with which the hands 44R, 44L of the two arms 5, 5 of the robot 1 are to engage are determined on the basis of the desired object motion trajectory. The positions/postures of the portions are to have a predetermined position/posture relationship relative to the position/posture of the object 120. Then, the hand position/posture trajectories of the robot 1 (defining the trajectory of the point of action of an object reaction force to the robot 1) are determined such that they match the motion trajectories (position/posture trajectories) of the portions. Subsequently, the object reaction force moment about the provisional desired ZMP at each time (time at each certain time interval) is calculated from the determined hand position/posture trajectories, the desired object reaction force trajectory, and the provisional desired ZMP trajectory. And, the time series of the calculated object reaction force moment is obtained as the object reaction force moment trajectory. In a case where the robot 1 is moved close to the object 120 from a location that is apart from the object 120 and then the hands 44R, 44L are engaged with the object 120 to start the operation of pushing the object 120, the object reaction force trajectory and eventually the object reaction force moment trajectory until the time at which the hands 44R, 44L are engaged with the object 120 (the time being decided as appropriate) will be zero.

Subsequently, the procedure proceeds to S11 wherein a gait parameter of a normal turning gait as a cyclic gait following the current time's gait is determined. The gait parameter includes a foot trajectory parameter, which defines a foot position/posture trajectory in a normal turning gait, a ZMP trajectory parameter, which defines a desired ZMP trajectory, and an object reaction force trajectory parameter, which defines a desired object reaction force moment trajectory.

Before specifically explaining these gait parameters, an overview of a normal turning gait will be explained. In the following explanation, "initial" and "terminal" of a gait means the start time and the end time, respectively, of each gait or an instantaneous gait at the start time or the end time.

A normal turning gait means a cyclic gait that does not cause discontinuity in a motion state (a state, such as foot position/posture or body position/posture) of the robot 1 at a boundary of a gait (a boundary of a gait for each step in the present embodiment) when the gait is repeated.

In the present embodiment, a normal turning gait, which is a cyclic gait, is a gait for two steps of the robot 1. In other words, a gait composed of a first turning gait following the current time's gait and a second turning gait following the first turning gait is defined as the gait for one cycle of the normal turning gait, and the gait for one cycle is repeated. Here, the term "turning" is used, because setting a turning rate to zero means moving straight, so that moving straight can be also included in turning in a broad sense. Hereinafter, a normal turning gait may be abbreviated to a normal gait.

To supplement the explanation of a normal gait, in a bipedal moving robot as the robot 1, a normal gait for one cycle is composed of gaits for at least two steps (two successive unit gaits). It is also possible to set a complicated normal gait that has gaits for three steps or more defined as the gaits for one cycle. However, as will be discussed hereinafter, a normal gait is used only to determine a divergent component at the end of the current time's gait (the details thereof will be discussed later). For this reason, using the normal gait having the gaits for three steps or more as one cycle would provide less effect, whereas the processing for generating the gaits would be complicated. Thus, the gait for one cycle of normal gaits in the present embodiment is composed of a gait for two steps (first and second turning gaits). In the following explanation of the normal gait, for the convenience of explanation, the normal gait composed of a gait for two steps is regarded as the gait for one step. The normal gait is a virtual gait temporarily assumed (in the calculation processing by the gait generator 100) to determine a divergent component at the end of the current time's gait by the gait generator 100, and it is not directly output from the gait generator 100.

The term "divergence" means that the horizontal position of the body 3 of the bipedal moving robot 1 shifts to a position apart from the positions of both feet 22, 22. A value of a divergent component is a numeral value that indicates the degree of distance of the horizontal position of the body 3 of the bipedal moving robot 1 apart from the positions of both feet 22, 22 (more specifically, the origin of a supporting leg coordinate system set on the ground contact surface of the supporting leg foot 22).

In the present embodiment, gaits are generated using divergent components as indicators such that desired gaits are continuously generated without developing the divergence. More specifically, a divergent component at the start of a normal gait following a current time's gait is determined, and then the current time's gait is generated (a gait parameter that defines the current time's gait is determined) such that a divergent component at the end of the current time's gait matches the divergent component at the start of the normal gait (more generally, the body position/posture of the current time's gait converge to the body position/posture of the normal gait). Then, the divergent component at the start of the normal gait is determined on the basis of the gait parameter determined in S11 such that a condition of a normal gait in which a motion state of the robot 1 at the start of the normal gait (the start of the first turning gait) agrees with that at the end thereof (the end of the second turning gait)(this will be hereinafter referred to as a boundary condition of a normal gait) is satisfied on a dynamic model of the robot 1. The basic guideline for generating gaits described above is the same as that previously proposed in PCT international publication WO/02/40224A1 by the present applicant. Therefore, in the following explanation regarding the normal gaits, technical matters that are different from the matters described in PCT international publication WO/02/40224A1 will be mainly explained, and detailed explanation of similar technical matters may be omitted.

Returning to the explanation of S11, the foot trajectory parameter of the gait parameter of the normal gait is composed of the positions/postures of the supporting leg foot 22 and the free leg foot 22, respectively, at the start and the end of the first turning gait and the second turning gait, respectively, the gait cycle of each turning gait, and the like, and the foot trajectory parameter is determined such that the foot position/posture trajectory is connected in the order of the current time's gait, the first turning gait, and the second turning gait. The following will explain a specific setting method with reference to FIG. 11.

The free leg foot position/posture at the start of a first turning gait are to be the supporting leg foot position/posture at the end of the current time's gait observed from the next time's gait supporting leg coordinate system. The supporting leg foot position/posture at the end of the current time's gait are the position/posture of the supporting leg foot 22 obtained when the supporting leg foot 22 at the start of the current time's gait is rotated in the pitch direction until substantially the entire bottom surface of the supporting leg foot 22 is brought in contact with a floor without slippage while the supporting leg foot 22 at the start of the current time's gait is held in contact with the floor (they agree with the predicted landing position/posture of the free leg foot 22 of the last time's gait). The position/posture on a next time's gait supporting leg coordinate system are determined on the basis of the predicted landing position/posture of the free leg foot 22 of the current time's gait, as shown in FIG. 11.

The supporting leg foot position/posture at the start of the first turning gait are to be the free leg foot position/posture at the end of the current time's gait observed from the next time's gait supporting leg coordinate system. The free leg foot position/posture at the end of the current time's gait are determined to be the position/posture based on the predicted landing position/posture of the free leg foot 22 of the current time's gait (or the next time's gait supporting leg coordinate system determined based thereon). Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while the free leg foot 22 is held in contact with a floor provide the predicted landing position/posture of the free leg foot 22 of the current time's gait.

The free leg foot position/posture at the end of the first turning gait are to be the free leg foot position/posture at the end of the next time's gait observed from the next time's gait supporting leg coordinate system. The free leg foot position/ posture at the end of the next time's gait are determined to be the position/posture based on the predicted landing position/ posture of the free leg foot 22 of the next time's gait (or the next time but one gait supporting leg coordinate system determined based thereon) in the same manner as the technique for determining the free leg foot position/posture at the end of the current time's gait.

The supporting leg foot position/posture at the end of the first turning gait are the position/posture of the supporting leg foot 22 obtained when the supporting leg foot 22 whose position/posture have been matched with the next time's gait supporting leg coordinate system is rotated in the pitch direction until substantially the entire bottom surface of the supporting leg foot 22 is brought in contact with a floor without slippage while the supporting leg foot 22 is held in contact with the floor (the position/posture agree with the predicted landing position/posture of the free leg foot 22 of the current time's gait).

The free leg foot position/posture at the start of the second turning gait are to be the supporting leg foot position/posture at the end of the first turning gait observed from the next but one time's gait supporting leg coordinate system. The supporting leg foot position/posture at the start of the second turning gait are to be the free leg foot position/posture at the end of the first turning gait observed from the next but one time's gait supporting leg coordinate system.

The free leg foot position/posture at the end of the second turning gait is determined such that the position/posture thereof observed from the next but one time's gait supporting leg coordinate system agree with the free leg foot position/ posture at the end of the current time's gait observed from the current time's gait supporting leg coordinate system. The supporting leg foot position/posture at the end of the second turning gait are determined such that the position/posture thereof observed from the next but one time's gait supporting leg coordinate system agree with the supporting leg foot position/posture at the end of the current time's gait observed from the current time's gait supporting leg coordinate system.

The gait cycles of the first turning gait and the second turning gait are set to be the same as the next time's gait cycle (this being the difference between the predicted landing time of the free leg foot 22 of the current time's gait and the predicted landing time of the free leg foot 22 of the next time's gait). The gait cycles of the first turning gait and the second turning gait do not necessarily have to be the same with each other; however both cycles are preferably decided on the basis of at least the next time's gait cycle. Motion parameters (including time parameters, such as a two-leg supporting period) of the current time's gait, the first turning gait, and the second turning gait other than those described above are appropriately determined on the basis of the aforesaid determined parameters such that a gait condition (e.g., whether the velocity of an actuator falls within a permissible range, whether a movable angle is exceeded, or whether there is interference with a floor) is satisfied.

A ZMP trajectory parameter of the gait parameter of a normal gait is determined such that the ZMP trajectory defined by the ZMP trajectory parameter leads to an increased stability allowance of the robot 1 and the ZMP trajectory does not incur a sudden change, as in the case where a desired ZMP trajectory parameter has been provisionally determined in S07 described above.

Further, an object reaction force moment trajectory parameter of a normal gait is determined such that a cyclic condition is satisfied. For example, it is assumed that an object reaction force moment trajectory associated with a current time's gait, a next time's gait, and a next but one time's gait is as shown in FIG. 12(a). Here, the object reaction force moment trajectory of the current time's gait is the trajectory determined in S09. The object reaction force moment trajectory of the next time's gait is the trajectory calculated in the same manner as that in S09 on the basis of the object reaction force trajectory and the desired object motion trajectory of the next time's gait determined in S03 and the ZMP trajectory defined by the ZMP trajectory parameter of a normal turning gait. The object reaction force moment trajectory of the next but one time's gait is the trajectory calculated in the same manner as that in S09 on the basis of the object reaction force trajectory and the desired object motion trajectory of the next but one time's gait determined in S03 and the ZMP trajectory defined by the ZMP trajectory parameter of a normal turning gait.

At this time, the object reaction force moment trajectory parameter of the normal turning gait is determined such that the object reaction force moment trajectory of the normal turning gait will be, for example, the trajectory shown in FIG. 12(b). In this example, the object reaction force moment trajectory from the start to the end of the first turning gait of the normal turning gait is determined such that the object reaction force moment trajectory continues to the object reaction force moment trajectory of the current time's gait and agrees with the object reaction force moment trajectory of the next time's gait. Further, the object reaction force moment trajectory of the second turning gait of the normal turning gait is determined such that the object reaction force moment trajectory of the second turning gait continues to the object reaction force moment trajectory of the first turning gait and agrees with the object reaction force moment trajectory of the next but one time's gait from the start of the second turning gait up to time tx immediately before the end thereof, while the object reaction force moment trajectory of the second turning gait continually changes to the same value as the value at the start of the first turning gait (the start of the normal turning gait) from the value at time tx from time tx to the end thereof. Time tx corresponds to, for example, the time at a break point of the ZMP trajectory of the normal turning gait.

If the difference between the value of an object reaction force moment at the start of the next time's gait and the value of an object reaction force moment of the next but one time's gait is not very large, then the value of the object reaction force moment at the start of the normal turning gait and the value of the object reaction force moment at the end thereof do not necessarily have to be the same.

Subsequently, the procedure proceeds to S13 wherein a divergent component at the start of the normal turning gait is determined. In this case, since the normal turning gait is a cyclic gait, the divergent component at the start of the normal turning gait is determined such that the initial state (including the divergent component at the start) of a motion of the first turning gait and the terminal state (including the divergent component at the end) of a motion of the second turning gait agree with each other on a predetermined dynamic model of the robot 1.

Before explaining in detail the processing in this S13, the dynamic model of the robot 1 used for the processing in this S13 and the dynamic calculation for determining a desired body position by using the dynamic model will be explained. The dynamic model is used for the processing in S13 and also for determining a current time's gait by the processing up to S37, which will be discussed later; it is a dynamic model that expresses simplified (approximate) dynamic behaviors of the robot 1 (a relationship between forces acting on the robot 1 and motions thereof). Hereinafter, the dynamic model will be referred to as the robot simplified model. The basic structure of this robot simplified model is the same as that in PCT international publication WO/02/40224A1, but it differs from the one in the application in that an object reaction force moment is taken into account.

FIG. 13 shows the structure of the robot simplified model. As illustrated, the robot simplified model is a three-mass-point model and constructed such that the dynamics of the legs 2 and the dynamics of the body 3 do not interfere with each other, and the dynamics of the entire robot 1 is indicated by linear connections thereof.

The robot simplified model is constructed of an inverted pendulum A and two leg mass points 2m, 2m (a supporting leg mass point and a free leg mass point). Each leg mass point 2m is a mass point associated with each leg 2. Each of these leg mass points 2m is a fixed point in a local coordinate system arbitrarily set fixedly on the foot 22 of each corresponding leg 2, and the position thereof is uniquely determined on the basis of the position/posture of each foot. For example, each foot mass point 2m is set at the point that is shifted toward the center of the ankle joint from a representative point of the sole of the foot 22 to the ankle joint side by a predetermined distance.

The inverted pendulum A is constituted of a free supporting point a, which horizontally moves, a mass point b, and a mass-free, length-variable link c that connects the supporting point a and the mass point b. In this case, it is assumed that even if the link c inclines, the link c expands or contracts so as to maintain a height h of the mass point b observed from the supporting point a at a constant value.

The mass point b of the inverted pendulum A (hereinafter referred to simply as the inverted pendulum mass point b) corresponds to a mass point of the body 3 of the robot 1, and therefore, the inverted pendulum mass point b may be hereinafter referred to as the body mass point b. A position of the inverted pendulum mass point b will be hereinafter abbreviated to an inverted pendulum position. The mass of the body mass point b includes the mass of the body 3 and the masses of the arms 5, 5 and the head 4.

The horizontal position of the body 3 of the robot 1 is geometrically determined from the horizontal position of the inverted pendulum mass point b. Specifically, for example, the horizontal position (an XY coordinates observed in the supporting leg coordinate system) of the representative point of the body 3, i.e., the horizontal component of the body position, agrees with the horizontal position of the inverted pendulum mass point b. In other words, as shown in FIG. 13, the representative point of the body 3 and the inverted pendulum mass point b are on the same vertical line.

The ZMP of the inverted pendulum A is located at the position of the free supporting point a (no moment is generated about the supporting point a); therefore, the position of the supporting point a of the inverted pendulum A will be hereinafter referred to as the inverted pendulum ZMP and denoted by ZMPpend.

To represent the robot simplified model by mathematical expressions, the variables and parameters related to the model will be defined as follows.

msup: Mass of supporting leg mass point 2m; mswg: Mass of free leg mass point 2m; mb: Mass of inverted pendulum mass point b; mtotal: Total mass of the robot 1 (=msup+mswg+mb); mfeet: Total mass of both legs 2, 2 (=msup+mswg); xsup: Position of supporting leg mass point 2m; xswg: Position of free leg mass point 2m; xb: Position of inverted pendulum (Position of the body mass point b); and h: Height of inverted pendulum (Height from the supporting point a to the inverted pendulum mass point b of the inverted pendulum A).

Hereinafter, xb, xsup, and xswg will be expressed by three-dimensional vectors (XYZ coordinate vectors) unless otherwise specified. When X takes an arbitrary variable, dX/dt denotes a first-order differential of X and d2X/dt2 denotes a second-order differential of X. "g" denotes a gravitational acceleration constant. G denotes a gravitational acceleration vector whose X component, Y component, and Z component are 0, 0, and −g, respectively.

In the robot simplified model shown in FIG. 13, the moment acting about a certain point of action P due to a total inertial force of both leg mass points $2m$, $2m$ (a resultant force of the inertial force due to the motions of both leg mass points $2m$, $2m$ and gravity) is defined as a leg total inertial force moment about point P, and a coordinate (position) of the point of action P is denoted by xp.

Expression 01 given below is a dynamic definitional equation of the leg total inertial force moment about the point P.

Leg total inertial force moment about point $P =$
$msup(xsup - xp) * G - msup(xsup - xp) * d2xsup / dt2 +$
$mswg(xswg - xp) * G - mswg(xswg - xp) * d2xswg / dt2$ Expression 01

The leg ZMP is denoted by ZMPfeet and defined by Expression 02. However, the height of the leg ZMP (Z component of ZMPfeet) is the same as the height of the point P. This leg ZMP is a value that is associated, in a quasi manner, with the resultant force of the inertial force generated by motions of the two legs 2, 2 and gravity.

Leg total inertial force moment about point $P = m$feet*
$(ZMP$feet$-xp)*G$    Expression 02

The point of action P is set such that the approximation accuracy of the robot simplified model is enhanced. For example, the point of action P related to the current time's gait is set such that it linearly moves at constant velocity from the origin of the last time's gait supporting leg coordinate system to the origin of the supporting leg coordinate system of a current time's gait during a two-leg supporting period and that it is maintained at the origin of the current time's gait supporting leg coordinate system during a one-leg supporting period following the two-leg supporting period. The same applies to the point of action P related to the first turning gait and the second turning gait of a normal turning gait.

Further, the result obtained by dividing an object reaction force moment about a desired ZMP by the total mass mtotal of the robot 1 is defined as the object reaction force ZMP, and this is denoted as ZMPobj. More specifically, ZMPobj is defined by the following Expression 03.

$ZMP$obj$=$Object reaction force moment about desired
$ZMP/m$total    Expression 03

At this time, a linear relationship of the following Expression 04 approximately holds among the desired ZMP, the leg ZMP (ZMPfeet), the inverted pendulum ZMP (ZMPpend), and the object reaction force ZMP.

$ZMP$pend$=m$total$/mb*$desired $ZMP-m$feet$/$
$mb*ZMP$feet$-m$total$/mb*ZMP$obj    Expression 04

Expression 04 is a relational expression on a sagittal plane (XZ plane), and on a lateral plane (YZ plane), the sign of a third term of the right side in Expression 03 is reversed from "−" to "+."

Further, a differential equation denoting a behavior of the inverted pendulum A is represented by the following Expression 05.

Horizontal component of $d2xb/dt2=g/h*$(Horizontal
component of $xb$−Horizontal component of
$ZMP$pend)    Expression 05

Expressions 01 to 05 given above are the expressions that describe the dynamics of the robot simplified model shown in FIG. 13.

Using the robot simplified model makes it possible to determine a desired body position from desired foot position/posture, an object reaction force moment about a desired ZMP, the desired ZMP, and a desired body posture by the following dynamic calculation.

The dynamic calculation will be explained with reference to the block diagram of FIG. 14. FIG. 14 is the block diagram showing the dynamic calculation. The leg ZMP (ZMPfeet) is calculated according to Expressions 01 and 02 given above by a leg ZMP calculator 220 from the trajectories of desired positions/postures of both feet (desired positions/postures of the supporting leg foot 22 and the free leg foot 22) and the point of action P set as described above.

Further, the object reaction force moment about the desired ZMP is multiplied by 1/mtotal by a multiplier 222 to calculate the object reaction force ZMP (ZMPobj). Then, the result obtained by multiplying the calculated ZMPfeet by mfeet/mtotal by a multiplier 224 and the ZMPobj are subtracted from the desired ZMP by a subtractor 226, and a multiplier 228 multiplies the result of the subtraction by mtotal/mb, thereby carrying out the calculation of the right side of Expression 04 mentioned above. Thus, the inverted pendulum ZMP(ZMPpend) is calculated. Incidentally, ZMPpend determined according to the aforesaid calculation processing is on the sagittal plane. To calculate ZMPpend on the lateral plane, the calculation result of the multiplier 222 with a reversed sign may be input to the subtractor 226.

By supplying the ZMPpend calculated as described above to the inverted pendulum A, the inverted pendulum horizontal position xb is calculated according to Expression 05 given above. Further, based on the inverted pendulum horizontal position xb and the desired body posture, a desired body position is determined by a body position determiner 230. In this case, the body position determiner 230 defines the inverted pendulum horizontal position xb as the desired body horizontal position. Further, a desired body vertical position is determined on the basis of a desired body posture or the like by the body height determining technique previously proposed by the present applicant in, for example, Japanese Patent Laid-Open H10-86080.

Returning to the explanation of FIG. 5, the processing in S13 will be explained in detail below.

The processing in S13 determines the divergent component at the start of a normal gait on the basis of the aforesaid robot simplified model. If the divergent component in the gait is denoted by q and the horizontal velocity of the mass point b of the inverted pendulum A (or the body horizontal velocity) is denoted by vb, then q is defined by the following Expression 06 in the present embodiment.

$q=xb+vb/\omega 0$    Expression 06 where $\omega 0$ denotes a natural frequency of the inverted pendulum A, that is, a square root of g/h.

The technical meaning of the divergent component defined as described above has been explained in detail in PCT international publication WO/02/40224A1, so that the explanation thereof will be omitted herein.

When the divergent component q is defined as described above, if the dynamic equation of the inverted pendulum A (the above Expression 05) is broken up, a solution is given to q, and the above Expression 04 is applied to the solution result, then the following Expression 07 is obtained. The desired ZMP is denoted as ZMPtotal.

$$q[k] = \exp(\omega 0\, k\Delta t) * q[0] +$$

$$\exp(\omega 0 k\Delta t) * (\exp(-\omega 0\Delta t) - 1) *$$

$$\sum (\exp(-i\omega 0\Delta t) * mtotal/mb * ZMPtotal[i]) -$$

$$\exp(\omega 0 k\Delta t) * (\exp(-\omega 0\Delta t) - 1) *$$

$$\sum (\exp(-i\omega 0\Delta t) * mfeet/mb * ZMPfeet[i]) -$$

$$\exp(\omega 0 k\Delta t) * (\exp(-\omega 0\Delta t) - 1) *$$

$$\sum (\exp(-i\omega 0\Delta t) * mtotal/mb * ZMPobj[i])$$

Expresssion 07 where exp( ) means an exponential function of the base e of a natural logarithm. Further, Δt denotes time interval of a discrete system, and k denotes the number of steps (kΔt means time). Further, Σ( ) of Expression 07 means cumulative adding calculation from i=0 to i=k−1.

Expression 07 is an expression that describes the divergent component q on the sagittal plane, and the expression that describes the divergent component q on the lateral plane is an expression obtained by reversing all signs of a fourth term of the right side of Expression 07 from "−" to "+".

Here, attention will be focused on a divergent component at the start of a normal turning gait (the start of the first turning gait) (hereinafter referred to as the initial divergent component) and a divergent component at the end (the end of the second turning gait) (hereinafter referred to as the terminal divergent component); q[0] (a divergent component at time 0) denotes the initial divergent component, and q[k] (a divergent component at time kΔt) denotes a terminal divergent component.

At this time, a first term of the right side of Expression 07 denotes the terminal divergent component generated by the initial divergent component. A second term of the right side denotes the terminal divergent component generated by a desired ZMP pattern. A third term of the right side denotes the terminal divergent component generated by motions of both legs 2, 2 (motions of both leg mass points 2m, 2m). A fourth term of the right side denotes the terminal divergent component generated by an object reaction force moment pattern. Hereinafter, the second term of the right side will be denoted by Wzmptotal, the third term of the right side will be denoted by Wfeet, and the fourth term of the right side will be denoted by Wobj. More specifically, Wzmptotal, Wfeet, and Wobj are defined by the following expressions 08a, 08b, and 08c.

$$Wzmptotal = \exp(\omega 0 k\Delta t) * (\exp(-\omega 0\Delta t) - 1) *$$
$$\sum (\exp(-i\omega 0\Delta t) * mtotal/mb * ZMPtotal[i])$$

Expression 08a $$Wfeet = -\exp(\omega 0 k\Delta t) * (\exp(-\omega 0\Delta t) - 1) *$$
$$\sum (\exp(-i\omega 0\Delta t) * mfeet/mb * ZMPfeet[i])$$

Expression 08b $$Wobj = -\exp(\omega 0 k\Delta t) * (\exp(-\omega 0\Delta t) - 1) *$$
$$\sum (\exp(-i\omega 0\Delta t) * mtotal/mb * ZMPobj[i])$$

Expression 08c

Incidentally, Expression 08c is an expression that defines Wobj on the sagittal plane, and Wobj on the lateral plane is obtained by reversing the sign of the right side of Expression 08c.

Rewriting the above Expression 07 by using these Wzmptotal, Wfeet, and Wobj provides the following Expression 09.

$$q[k]=\exp(\omega 0 k\Delta t)*q[0]+Wzmptotal+Wfeet+Wobj$$

Expression 09

In the present embodiment, the initial divergent component that satisfies a boundary condition of a normal turning gait is analytically determined according to the above Expressions 08a, 08b, 08c, and 09 such that the initial divergent component observed in the supporting leg coordinate system of the normal turning gait following a current time's gait (the next time's gait supporting leg coordinate system (X'Y' coordinate system) shown in FIG. 11) agrees with the terminal divergent component of the normal turning gait (the normal turning gait following the current time's gait) observed from the supporting leg coordinate system of the gait following the normal turning gait (the next but two time's gait supporting leg coordinate system (X'''Y''' coordinate system) shown in FIG. 11).

Here, if the terminal divergent component of the normal turning gait observed from the supporting leg coordinate system of the gait following the normal turning gait (the next but two time's gait supporting leg coordinate system (X'''Y''' coordinate system) shown in FIG. 11) is denoted by q'[k], then the following Expression 10 must hold to satisfy the boundary condition of the normal turning gait.

$$q[0]=q'[k]$$

Expression 10

Further, if a rotating matrix for coordinate-converting a value described in the supporting leg coordinate system of the gait following the normal turning gait (the next but two time's gait supporting leg coordinate system (X'''Y''' coordinate system) shown in FIG. 11) into a value described in the supporting leg coordinate system of the normal turning gait (the next time's gait supporting leg coordinate system (X'Y' coordinate system) shown in FIG. 11) is denoted by M, and a parallel movement vector of a coordinate origin is denoted by B, then the following Expression 11 is obtained.

$$q[k]=Mq'[k]+B$$

Expression 11

Thus, the following Expression 12 is derived from these Expressions 10 and 11.

$$q[k]=Mq[0]+B$$

Expression 12

This Expression 12 indicates the condition to be satisfied by the initial divergent component q[0] and the terminal divergent component q[k] in order to satisfy the boundary condition of the normal gait.

And, the following Expression 13 is derived from this Expression 12 and the above Expressions 08a to 08c and 09.

$$q[0]=\operatorname{inv}(M-\exp(\omega 0 k\Delta t)I)(Wzmptotal+Wfeet+Wobj-B)$$

Expression 13

In Expression 13, inv( ) indicates an inverted matrix of the matrix in the parenthesis, and I denotes a unit matrix.

In the present embodiment, based on this Expression 13, the initial divergent component q[0] that satisfies the boundary condition of the normal turning gait is determined.

Specifically, based on the ZMP trajectory parameter of the normal turning gait determined in S11 described above, ZMPtotal[i](i=0, 1, ..., k−1), which denotes an instantaneous value of a desired ZMP at each time iΔt(i=0, 1, ..., k−1) of a normal turning gait, is determined, and the determined value is used to carry out the calculation of the right side of Expression 08a mentioned above, thereby calculating Wzmptotal. Incidentally, Wzmptotal may be calculated by algorithm that utilizes the fact that a desired ZMP trajectory is a kinked-line trajectory, as explained in the PCT international publication WO/02/40224A1.

Further, based on the foot trajectory parameter of the normal turning gait determined in the above S11, the instantaneous values of the foot position/posture at each time $i\Delta t (i=0, 1, \ldots, k-1)$ of a normal turning gait are determined, and the determined values are applied to an expression that represents the above Expressions 01 and 02 in terms of discrete systems, thereby determining ZMPfeet[i]. Incidentally, the foot position/posture are calculated for each foot 22 by using, for example, the finite-duration setting filter proposed by the present applicant in Japanese Patent No. 3233450. In this case, the foot position/posture trajectory to be calculated will be a trajectory in which the free leg foot 22 in each of the first turning gait and the second turning gait of a normal turning gait rises at the start time of a one-leg supporting period and moves toward a predicted landing position of the free leg foot 22, and the free leg foot 22 lands at the heel thereof at a position corresponding to the predicted landing position at predicted landing time of the free leg foot 22. Then, the right side of the above Expression 08b is calculated using the ZMPfeet1[i] determined as described above, thereby calculating Wfeet. Supplementally, if the predicted landing position/posture of the free leg foot 22 are the same landing position/posture of the supporting leg foot 22 in the preceding gait, then the foot position/posture trajectory will be a trajectory in which the landing position/posture are maintained to be constant. Alternatively, however, a foot position/posture trajectory in which the free leg foot 22 is raised once and then put back to its original landing position/posture may be generated.

Further, based on an object reaction force moment trajectory parameter of the normal turning gait determined in the above S11, an object reaction force moment about a desired ZMP at each time $i\Delta t (i=0, 1, \ldots, k-1)$ of a normal turning gait is determined, and the result is divided by mtotal to determine ZMPobj[i]. The determined ZMPobj[i] is used to calculate the right side of the above Expression 08c, thereby calculating Wobj.

The interval time $\Delta t$ used in the calculation of Wzmptotal, Wfeet, and Wobj is preferably the same as the calculation processing cycle of the gait generator 100; however, it may be set to be longer than the aforesaid calculation processing cycle to shorten the calculation processing time.

Then, from Wzmptotal, Wfeet, and Wobj determined as described above, the right side of the above Expression 12 is calculated so as to calculate the initial divergent component q[0] that satisfies the boundary condition of the normal turning gait.

The above has given the details of the processing in S13 in the present embodiment.

In the present embodiment, the initial divergent component q[0] has been analytically determined; alternatively, however, an initial divergent component of the normal turning gait that substantially agrees with a terminal divergent component of the normal turning gait observed from the supporting leg coordinate system of the gait that follows a normal turning gait following a current time's gait may be determined by an exploratory technique, as explained in, for example, the second embodiment in PCT international publication WO/02/40224A1.

Returning to the explanation of the flowchart of FIG. 5, after the processing in S13 is carried out as described above, the procedure proceeds to S15 wherein a gait parameter of a current time's gait is provisionally determined. The gait parameter includes a foot trajectory parameter that defines the foot position/posture trajectory in the current time's gait, a ZMP trajectory parameter that defines a desired ZMP trajectory, and an object reaction force trajectory parameter that defines a desired object reaction force moment trajectory.

The foot trajectory parameter of the gait parameter of the current time's gait is composed primarily of the positions/postures of the supporting leg foot 22 and the free leg foot 22, respectively, at the start and the end of the current time's gait and a gait cycle of the current time's gait. In this case, the free leg foot position/posture at the start of the current time's gait are the free leg foot position/posture of the current time's gait at the end of the last time's gait (the supporting leg foot position/posture of the last time's gait) observed from the current time's gait supporting leg coordinate system. The supporting leg foot position/posture at the start of the current time's gait are the supporting leg foot position/posture of the current time's gait at the end of the last time's gait (the free leg foot position/posture of the last time's gait) observed from the current time's gait supporting leg coordinate system. The free leg foot position/posture at the end of the current time's gait are determined on the basis of the predicted landing position/posture of the free leg foot 22 of the current time's gait. Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while it is held in contact with a floor provide the predicted landing position/posture of the current time's gait. The supporting leg foot position/posture at the end of the current time's gait are the position/posture of the supporting leg foot 22 obtained when the supporting leg foot 22 is rotated in the pitch direction until substantially the entire bottom surface thereof is brought in contact with a floor without slippage while the supporting leg foot 22, whose position/posture have been matched with the current time's gait supporting leg coordinate system, is held in contact with the floor (the position/posture agree with the predicted landing position/posture of the free leg foot 22 of the last time's gait).

In the present embodiment, the supporting leg foot 22 at the end of the current time's gait has a posture that is substantially parallel to a floor surface; however, there is no need to always stick to this posture. For example, the heel of the supporting leg foot 22 may be off the floor surface at the end of a gait.

The ZMP trajectory parameter of the gait parameter of the current time's gait is set to be the same as the ZMP trajectory parameter provisionally determined in S07. Hence, a desired ZMP trajectory defined by this ZMP trajectory parameter has a pattern as shown in, for example, FIG. 10($a$) mentioned above.

Further, the object reaction force moment trajectory parameter of the gait parameter of the current time's gait is determined such that the object reaction force moment trajectory defined thereby agrees with the trajectory associated with the current time's gait of the object reaction force moment trajectory calculated in S09 mentioned above.

Subsequently, the procedure proceeds to S17 wherein the ZMP trajectory parameter of the gait parameter provisionally determined in S15 is corrected such that the current time's gait converges to a normal turning gait. To be more specific, the ZMP trajectory parameter is corrected such that the divergent component at the end of the current time's gait substantially agrees with the divergent component at the start of the normal turning gait.

In the present embodiment, the provisional desired ZMP is corrected by adding the ZMP correction amount shown in FIG. 10(b) to the provisional desired ZMP so as to cause the divergent component at the end of the current time's gait to agree with the divergent component at the start of the normal turning gait. Thus, the desired ZMP as shown in FIG. 10(c) is obtained.

In this case, the basic guideline of the processing for correcting the provisional desired ZMP is the same as that in PCT international publication WO/02/40224A1, but it differs from the one in the application in that an object reaction force moment is taken into account. The following will specifically explain the processing in S17, focusing mainly on the different aspect. Among the variables and symbols used in this processing, regarding the variables having the meanings similar to those explained in relation to the processing for determining the divergent component at the start of a normal gait (S13), the same variables and symbols previously defined in relation to a normal gait will be used in the explanation of the processing in S17. In the following explanation, for the convenience of understanding, a correction of a component of a ZMP in the X-axis direction will be explained.

In the present embodiment, the ZMP correction amount has a trapezoidal shape, as shown in FIG. 10(b), the height thereof being denoted by a. The time of the break points of the trapezoid is set to match the time of the break points of the provisional desired ZMP trajectory, as illustrated. In the present embodiment, the ZMP correction amount is generated in a one-leg supporting period of a current time's gait. Further, a result obtained by coordinate-converting the initial divergent component determined in S13 described above into the value observed from the current time's gait supporting leg coordinate system is denoted by q". In other words, the divergent component at the start of the normal turning gait observed in the current time's gait supporting leg coordinate system is denoted by q". Further, the divergent component at the end of the current time's gait generated due to the provisional desired ZMP trajectory is denoted by Wzmptmp and the divergent component at the end of the current time's gait generated due to the ZMP correction amount pattern when a=1 is denoted by Wtrim.

At this time, if the terminal divergent component generated due to the desired ZMP trajectory that has been corrected is denoted by Wzmptotal, then the following Expression 14 is approximately obtained.

$$Wzmp\text{total} = Wzmp\text{tmp} + a*W\text{trim} \qquad \text{Expression 14}$$

Accordingly, the terminal divergent component q" of the current time's gait after the desired ZMP has been corrected is represented by the following Expression 15 similar to the aforesaid Expression 09 explained in relation to the normal gait.

$$q'' = \exp(\omega 0 k \Delta t)*q[0] + Wzmp\text{tmp} + a*W\text{trim} + W\text{feet} + Wobj \qquad \text{Expression 15}$$

In Expression 15, $k\Delta t$ denotes the time of the end of a current time's gait, $q[0]$ denotes the divergent component at the start of the current time's gait, Wfeet denotes the terminal divergent component generated by motions of both legs 2, 2 of the current time's gait, and Wobj denotes a terminal divergent component generated due to the object reaction force moment trajectory of the current time's gait.

From this Expression 15, the following Expression 16 for determining the height a of the trapezoid of the ZMP correction amount is obtained.

$$a = (q'' - \exp(\omega 0 k \Delta t)*q[0] - Wzmp\text{tmp} - W\text{feet} - Wobj)/W\text{trim} \qquad \text{Expression 16}$$

Thus, in the present embodiment, the height a of the trapezoid of the ZMP correction amount is determined according to Expression 16. In this case, the initial divergent component q[0] is calculated according to the aforesaid Expression 06 from the position of the inverted pendulum (or the body position) at the start of the current time's gait and the changing velocity thereof. Further, Wzmptmp is determined in the same manner as that for determining Wzmptotal related to a normal turning gait from the provisional desired ZMP trajectory defined by the ZMP trajectory parameter provisionally determined in S15. Wtrim is determined in the same manner as that for determining Wzmptotal related to a normal turning gait from the ZMP correction amount pattern determined by setting the height a of the trapezoid to 1. Wfeet is determined according to the aforesaid Expression 08b in the same manner as that for determining Wfeet related to a normal turning gait from the foot trajectory parameter provisionally determined in S15. Wobj is determined according to the aforesaid Expression 08c in the same manner as that for determining Wobj related to a normal turning gait from the object reaction force moment trajectory parameter provisionally determined in S15.

In S17, the ZMP correction amount determined on the basis of the height a of the trapezoid determined as described above is added to a provisional desired ZMP trajectory so as to correct the ZMP trajectory parameter.

In the present embodiment, the ZMP correction amount has been analytically determined; alternatively, however, it may be determined in an exploratory manner. In this case, processing is repeated in which a current time's gait is provisionally created using a desired ZMP trajectory obtained by correcting a provisional desired ZMP by a ZMP correction amount in which the value of the trapezoid height a has been set to a proper value, then based on, for example, the difference between the divergent component at the end of the provisionally created current time's gait and the divergent component at the start of a normal gait, the value of the trapezoid height a is corrected such that the difference is reduced. And, lastly, the ZMP correction amount may be determined on the basis of the value of the trapezoid height a obtained when the divergent component at the end of the provisionally created current time's gait and the divergent component at the start of a normal gait substantially agree with each other.

After the processing in S17, the procedure proceeds to S19 wherein it is determined whether the desired ZMP determined on the basis of the corrected ZMP trajectory parameter is appropriate. Specifically, if the desired ZMP after a correction does not deviate from the ground contact surface of the supporting leg foot 22 of the current time's gait or deflected to the vicinity of a boundary of the ground contact surface, that is, if a stability allowance of the robot 1 can be secured, then it is determined that the desired ZMP is appropriate, and if not, then it is determined that the desired ZMP is inappropriate.

If the determination result of S19 is NO, then the procedure proceeds to S21 wherein an element related to a parameter other than the ZMP trajectory parameter of the current time's gait parameter, e.g., a desired object reaction force trajectory related to an object reaction force trajectory parameter, is corrected. In this case, the desired object reaction force trajectory is corrected such that a ZMP correction amount is minimized as much as possible (smaller than at least the ZMP correction amount determined before the desired object reaction force trajectory is corrected) when the processing of S09 to S17 is carried out again after the correction.

An example of correcting a desired object reaction force trajectory will be explained below. For instance, it is assumed that a desired object motion trajectory (position trajectory)

based on a moving plan is a trajectory in which the object 120 is decelerated in the X-axis direction from time t1 and stopped at time t3, as shown by a graph g2 of FIG. 15(*a*). A graph g3 of FIG. 15(*a*) is an example of a desired body position trajectory determined on the basis of the desired object motion trajectory. At this time, if deceleration or acceleration of the object 120 from time t1 is relatively large, then the ZMP correction amount related to the current time's gait at certain current time t2 after the time t1 may become excessive in the positive direction of the X axis, thus deviating from the ground contact surface of the supporting leg foot 22 (in this case, a determination result of S19 is NO). And, if a desired gait were continued to be generated as it is, then a desired gait in which the body 3 of the robot 1 bumps against the object 120 at certain time t4 would be undesirably generated, as illustrated in the figure.

Therefore, in such a case, the desired object reaction force trajectory is corrected such that the desired object reaction force is increased in the negative direction of the X axis during a certain period ΔT1 after the current time t2, as shown in FIG. 15(*b*), in relation to the desired object reaction force trajectory provisionally determined in S03, as described above. In other words, the desired object reaction force is corrected such that an acting force to be applied to the object 120 from the robot 1 (a force obtained by reversing the sign of the desired object reaction force) is increased in the positive direction of the X axis. In this case, the magnitude of the period ΔT1 during which the desired object reaction force is increased or an increment ΔF1 thereof is determined such that the ZMP correction amount determined by the processing of the aforesaid S09 to S17 on the basis of a corrected desired object reaction force is minimized as much as possible and a determination result of S19 is YES. Such ΔT1 or ΔF1 can be determined in an analytical manner or an exploratory manner.

By correcting the desired object reaction force trajectory as described above, the object reaction force moment trajectory parameter of the current time's gait parameter is determined in S15 such that a motion of the body 3 that causes the robot 1 to positively push the object 120 is implemented. As a result, the desired gait generated on the basis of the current time's gait parameter will be a gait that prevents the body 3 of the robot 1 from bumping against the object 120 while securing a stability allowance at the same time.

After carrying out the processing in S21, the processing of S09 to S17 is executed again as mentioned above. At this time, the determination result in S19 following S17 will be YES, and in this case, the procedure will then proceed to S23 in FIG. 6.

In S23, based on a current time's gait parameter and a normal gait parameter at current time, a desired body position/posture trajectory from the current time to the end of a second turning gait of a normal gait (up to the third step, including one step of the current time's gait) is calculated, and also, based on a desired object motion trajectory, a desired hand position/posture trajectory is calculated.

In this case, the desired body position/posture trajectory is calculated, as explained with reference to the block diagram of FIG. 14 mentioned above, on the basis of the gait parameter of each gait in the order of the first turning gait and the second turning gait of the current time's gait and the normal turning gait. Further, the desired hand position/posture trajectory is calculated on the basis of the desired object motion trajectory in the same manner as that for determining it in S09 in the order of the first turning gait and the second turning gait of the current time's gait and the normal turning gait. In this case, the desired object motion trajectory associated with the first turning gait and the second turning gait of the normal turning gait is the desired object motion trajectory associated with a next time's gait and a next but one time's gait of the desired object motion trajectory provisionally determined in S03.

Subsequently, the procedure proceeds to S25 wherein the geometric restraining conditions of the robot 1 and the object 120 are checked. Here, the geometric restraining conditions include conditions in which, for example, whether the object 120 and the robot 1 interfere with each other (e.g., the body 3 hitting the object 120) and whether the rotational angles of the joints of each arm 3 remain within mechanical limits. Whether the body 3 of the robot 1 and the object 120 interfere with each other can be determined from desired body position/posture and a desired object motion trajectory. Further, the rotational angles of the joints of each arm 3 can be determined from the desired body position/posture and the desired hand position/posture, so that it can be determined whether the rotational angles fall within the mechanical limits.

The determination processing in S25 is sequentially carried out on an instantaneous value of a desired body posture and the like at predetermined time intervals from current time to the end of the second turning gait. More specifically, on each instantaneous value, if the determination result of S25 is OK, then it is determined in S27 whether checking at every time from current time to the end of the second turning gait has been completed. And, if the determination result in this S27 is NO, then the determination processing in S25 is repeated.

If the determination result in S25 is NG, then the procedure proceeds to S29 wherein at least one of the predicted landing position/posture and the desired object motion trajectory is corrected so as to satisfy the geometric restraining conditions at the time when the determination result indicated NG. An example of the correction will be explained with reference to FIG. 16.

Referring to the figure, it is assumed that the desired object motion trajectory (position trajectory) in the X-axis direction on the basis of a moving plan at current time t1 is the trajectory indicated by a graph g4 in the figure (hereinafter referred to as "the original trajectory"). It is further assumed that a desired body position and a desired object position at certain time t2 in the future come excessively close to each other with resultant interference between the body 3 and the object 120, causing the determination result of S25 to be NG. At this time, the desired object position at time t2 at which the interference occurs is shifted in the positive direction of the X axis, i.e., away from the robot 1, as indicated by the dashed-line arrow in the figure, and the desired object motion trajectory (position trajectory) over a period ΔT2 before and after time t2 is changed to the corrected trajectory indicated by a graph g5. The corrected trajectory g5 is determined such that it smoothly connects to the original trajectory g4 at both ends of the period ΔT2 in order to avoid a sudden change of a behavior of the robot 1. A shift amount ΔX at time t2 is determined such that it eliminates the possibility of interference between the body 3 of the robot 1 and the object 120 (such that the determination result of S25 is OK).

In the aforesaid example, the case where the desired object motion trajectory is corrected has been taken as an example and explained; alternatively, however, the predicted landing position/posture of the free leg foot 22 in a gait that includes the time at which the determination result of S25 is NG may be corrected instead of correcting the desired object motion trajectory. For instance, if the interference occurs at time t2 as in the case shown in FIG. 16, then the predicted landing position/posture in the gait that includes the time t2 may be corrected to position/posture away from the object 120 in the X-axis direction. As an alternative, both the desired object motion trajectory and the predicted landing position/posture may be corrected.

Upon completion of the correction processing in S29, the procedure returns to S05 to carry out the processing from this S05, as described above. Thus, if the geometric restraining conditions are not satisfied, a desired object motion trajectory or predicted landing position/posture are corrected and eventually a foot trajectory parameter of a current time's gait parameter is corrected. If the predicted landing position of the free leg foot 22 is corrected without correcting the desired object motion trajectory in S29, then the processing from S07 may be carried out, omitting the processing in S05.

Meanwhile, if the determination result of S27 is YES, then the procedure proceeds to S31 of FIG. 7. In this S31, current time's gait instantaneous values at current time except for hand position/posture instantaneous values are calculated on the basis of the current time's gait parameter such that a desired ZMP is satisfied.

The calculation processing is performed as described below. Based on a foot trajectory parameter of the current time's gait parameter, the instantaneous values of desired foot position/posture are calculated. In the same manner as in the case explained in relation to the processing for calculating ZMPfeet[i] in the processing of S13 described above, this calculation processing is performed on each foot 22 by using the finite-duration setting filter proposed by the present applicant in Japanese Patent No. 3233450. As in the case explained regarding a normal gait, if the predicted landing position/posture of the free leg foot 22 of the current time's gait are the same as the landing position/posture of the supporting leg foot 22 of the last time's gait, then the instantaneous values of the desired foot positions/postures of the current time's gait are maintained to be the state at the start of the current time's gait. Alternatively, however, the instantaneous values of the foot position/posture trajectory of the free leg foot 22 of the current time's gait may be generated such that the free leg foot 22 of the current time's gait is raised once and then put back to its original landing position/posture.

Further, an instantaneous value of the desired ZMP is calculated on the basis of a ZMP trajectory parameter of the current time's gait parameter, and an instantaneous value of a desired object reaction force moment is calculated on the basis of an object reaction force moment trajectory parameter.

Further, the instantaneous values of the desired body position/posture are calculated by the dynamic calculation in FIG. 14 described above from the instantaneous values of the desired foot position/posture, the instantaneous value of the desired ZMP, and the instantaneous value of the desired object reaction force moment calculated as described above. In the present embodiment, the desired body posture is, for example, a vertical posture. However, it is not required to maintain the desired body posture at the vertical posture; the desired body posture may be changed. If the desired body posture is changed, the robot simplified model is desirably a dynamic model that takes into account an angular momentum change of the robot 1 involved in the change of the posture of the body 3. For example, a dynamic model proposed by the applicant of the present application in PCT international publication WO/03/057422A1, as shown in FIG. 10 of the publication, may be used.

By the processing in S31 described above, the instantaneous values of the desired foot position/posture and the desired body position/posture of a motion of the desired gait of the robot 1 are determined. In the robot 1 in the present embodiment, each leg 2 has six degrees of freedom, so that once the desired body position/posture and the desired foot position/posture are determined, then the rotational angles of the joints of each leg 2 are uniquely determined. Supplementally, in the present embodiment, the desired body position/posture determined in S31 are further corrected by the processing in S39, which will be discussed later.

Subsequently, the procedure proceeds to S33, wherein an actual object position, which is a real position (moving position) of the object 120 at the previous calculation processing cycle (the calculation processing cycle of the gait generator 100), is estimated on the basis of a last time value of a final corrected desired hand position (a value at the last time calculation processing cycle). Here, the final corrected desired hand position is determined by an arm main controller 106, which will be discussed later, and it corresponds to a command value of an actual hand position of the robot 1. Thus, for example, the last time value of the final corrected desired hand position is defined as the last time value of an actual hand position of the robot 1, and a position that has a predetermined relative positional relationship therewith is estimated as the actual object position. It is also possible to provide the object 120 with a gyro sensor or an acceleration sensor, and to estimate an actual object position from detection values thereof. Supplementally, the processing in S33 corresponds to the actual moving position grasping means in the present invention.

Subsequently, the procedure proceeds to S35 wherein an instantaneous value (current time value) of a desired object motion, an instantaneous value (current time value) of an estimated disturbance force, and an instantaneous value (current time value) of a desired object reaction force are calculated using an object dynamic model on the basis of a difference between the actual object position estimated as described above and the desired object position (hereinafter referred to as the object position difference) and the current desired object motion trajectory. The desired object position out of the actual object position and the desired object position that define the object position difference uses the value determined at the last time calculation processing cycle (the last time's value). This processing in S35 is the core processing in the present invention.

Here, the object dynamic model used in the processing in S35 and the processing in S35 will be explained with reference to the block diagram of FIG. 17. FIG. 17 is a block diagram showing the calculation processing for determining a desired object position, a desired object reaction force, and an estimated disturbance force of a desired object motion in S03. The part indicated by a reference numeral 238 in the figure is an object dynamic model showing a relationship between forces acting on the object 120 and motions of the object 120. This object dynamic model partly differs in structure from that shown in FIG. 9 mentioned above, so that the object dynamic model in FIG. 17 will be referred to as the object dynamic model 2 in the following explanation to distinguish it from the object dynamic model shown in FIG. 9. Incidentally, the object dynamic model 2 corresponds to the object dynamic model in the present invention.

The basic structure of the object dynamic model 2 is the same as that of the object dynamic model in FIG. 9. A force acting on the object 120 (more specifically, a translational force in the horizontal direction) is taken as an input, and the input value (the value determined by a multiplier 242, which will be discussed later) is multiplied by an inverse number $1/M$ of a mass M of the object 120 by a multiplier 244 so as to determine a motional acceleration of the object 120, then the determined motional acceleration is sequentially integrated (double-integrated) by integrators 246 and 250. However, the object dynamic model 2 differs from the object dynamic model in FIG. 9 in that the integrator 250 additionally receives a model velocity manipulated variable in addition to an output (an integral value of motional acceleration) of the integrator 246. This model velocity manipulated variable is a velocity manipulated variable determined by a model velocity manipulated variable determiner 252 and by a feedback control law such that a difference between an actual object position and a desired object position approximates zero, and it is determined according to the following expression 17 in the present embodiment.

Model velocity manipulated variable=$Ke1$*Object position error+$\int (Ke2$*Object position error)$dt$    Expression 17

In other words, the model velocity manipulated variable is determined from an object position error by a PI control law (a proportional integral control law). Ke1 and Ke2 of Expression 17 denote predetermined gains. A model velocity manipulated variable determiner 252 in FIG. 17 is an arithmetic processor that performs the calculation of the right side of Expression 17. More specifically, based on an actual object position (the current time value determined in S33 at the current calculation processing cycle) and a desired object position (a last time value determined in S35 at the last calculation processing cycle), the model velocity manipulated variable determiner 252 determines an object position error, which is the difference thereof, by a subtractor 254. Then, a result obtained by multiplying the determined object position error by the gain Ke1 by a multiplier 256 (a proportional) and a result obtained by further integrating by an integrator 260 the result obtained by multiplying the object position error by the gain Ke2 by a multiplier 258 (an integral term) are added by an adder 262 to calculate a model velocity manipulated variable. The calculated model velocity manipulated variable is added to an output of the integrator 246 by an adder 248 provided at the input side of the integrator 250 of the object dynamic model 2, and then the result is supplied to the integrator 250. Supplementally, in the block diagram of FIG. 17, the model velocity manipulated variable is calculated and then the calculation result is additionally supplied to the object dynamic model 2; alternatively, however, the integrator 260 of the model velocity manipulated variable determiner 252 may be omitted and an output of the multiplier 258 may be input to the integrator 246 and the sum of an output of the integrator 246 at this time and an output of the multiplier 256 may be input to the integrator 250 at the same time. This will also cause an output of the object dynamic model 2 (output of the integrator 250) to be the same as that in FIG. 17. Supplementally, the model velocity manipulated variable determiner 252 corresponds to the motion manipulated variable determining means in the present invention, and a model velocity manipulated variable determined thereby corresponds to a motion manipulated variable of the object 120 on the object dynamic model 2.

In the object dynamic model 2 described above, a result obtained by integrating an output of the adder 248 by the integrator 250 is obtained as an instantaneous value of a desired object position. Further, an output of the adder 248 is an object model velocity, which is a moving velocity of the object 120 on the object dynamic model 2.

A required value of a force (translational force) acting on the object 120, which is an input to the object dynamic model 2, is obtained by multiplying a difference (Desired object velocity—Object model velocity), which is determined by a subtractor 240 from a desired object velocity based on a current desired object motion trajectory (a desired object motion trajectory when a determination result of S27 is YES) and an object model velocity, by a predetermined gain Kv by the multiplier 242. In other words, the required value of a translational force input to the object dynamic model 2 is determined by a feedback control law (the proportional control law in this example) such that a difference between a desired object velocity and an object model velocity converges to zero, as that shown in FIG. 9. However, the object model velocity in this case is an output of the adder 248, as described above, so that it is different from that shown in FIG. 9 in that a model velocity manipulated variable has been taken into account. Further, a desired object velocity is obtained as a first-order differential value of a position trajectory of a current desired object motion trajectory.

And, a value obtained by reversing the sign of the required value of the translational force determined as described above is determined as an instantaneous value of a desired object reaction force. Further, the required value of the translational force is input to the multiplier 244 of the object dynamic model 2, and the model velocity manipulated variable is input to the adder 248, thereby outputting an instantaneous value of a desired object position from the integrator 250 of the object dynamic model 2. In other words, a desired object position is sequentially determined by the dynamic calculation of the object dynamic model 2 while correcting the object model velocity as the motion state amount of the object 120 on the object dynamic model 2 by using the model velocity manipulated variable for bringing the difference between a desired object position and an actual object position close to zero.

Supplementally, in the present embodiment, the processing from S01 to S29 and the processing for determining a desired object velocity from the desired object motion trajectory finally obtained by the processing from S01 to S29 correspond to the desired motion state amount determining means in the present invention. In this case, a desired object velocity corresponds to a desired motion state amount. Further, the processing by the subtractor 240 and the multiplier 242 corresponds to the desired action force determining means in the present invention. Further, the calculation processing of the object dynamic model 2 corresponds to the desired moving position determining means in the present invention.

Further, the part indicated by a reference numeral 264 in FIG. 17 is an estimated disturbance force determiner that carries out the processing for determining an estimated disturbance force. An object model velocity and the required value of the translational force are input to the estimated disturbance force determiner 264. The object model velocity is input to a converter 266 expressed by a transfer function in the form of $M \cdot s/(Tc \cdot s+1)$, and an estimated value of a translational force acting on the object 120 is calculated by the converter 266. M in the transfer function of the converter 266 denotes the mass of the object 120 and Tc denotes a predetermined time constant. Hence, the converter 266 determines, as the estimated value of the translational force acting on the object 120, the result obtained by carrying out the filtering that has the time constant Tc on the value obtained by multiplying a differential value (first-order differential value) of the object model velocity by the mass of the object 120 (this corresponding to the instantaneous value of the resultant force of all forces acting on the object 120). In other words, an estimated value calculated by the converter 266 follows, with a first-order lag of the time constant Tc, a translational force that generates a motional acceleration of the object 120 (a differential value of an object model velocity) on the object dynamic model 2. Further, an instantaneous value of an estimated disturbance force is calculated by subtracting the required value of a translational force, which is an output of the multiplier 242, from the estimated value of the translational force by the subtractor 268. The instantaneous value of the estimated disturbance force thus determined is used in the calculation processing in S02 (refer to FIG. 9), as described above.

Supplementally, the estimated disturbance force determiner 264 corresponds to the disturbance force estimating means in the present invention.

Incidentally, an instantaneous value of a desired object posture of a desired object motion is determined such that, for example, it substantially agrees with the direction of a desired object velocity.

The above describes the calculation processing in S35.

Subsequently, the procedure proceeds to S37 wherein the instantaneous values (the current time values) of desired hand position/posture are determined on the basis of the instantaneous value of the desired object motion determined in S35. The instantaneous values of the desired hand position/posture are determined in the same manner as that for determining the desired hand position/posture trajectory in S09. Supplementally, the processing in S37 and the processing by the object reaction force balance controller 102, the leg main controller 104, and the arm main controller 106, which will be described later, correspond to the controlling means in the present invention.

Of the instantaneous values of the desired gait determined by the processing up to S37 described above, the desired body position/posture are determined using the aforesaid robot simplified model such that a desired ZMP is satisfied on the robot simplified model (such that the horizontal component of a moment generated about a desired ZMP by a resultant force of an inertial force attributable to a motion of the robot 1, the gravity, and an object reaction force moment is zero). Hence, the desired gait determined by the processing up to S37 is a gait in which a floor reaction force moment horizontal component about a desired ZMP is zero on the robot simplified model.

Here, the robot simplified model does not necessarily exhibit high dynamic accuracy although it is highly advantageous in that the calculation load of the gait generator 100 can be effectively reduced. For this reason, in the present embodiment, some constituent elements of a desired gait (specifically, the instantaneous values of desired body position/posture and the instantaneous value of a floor reaction force moment about a desired ZMP) are corrected by further using a robot dynamic model having higher dynamic accuracy (hereinafter referred to as "the full model"). This correction processing is called the full model correction, and this full model correction is performed in S39 that follows the processing in S37.

The full model correction is performed in exactly the same manner as that explained in, for example, Japanese Patent Laid-Open No. 2002-326173 previously proposed by the applicant of the present application. Therefore, the explanation thereof will be omitted in the present description. The full model correction may alternatively be accomplished in the same manner as that explained in, for example, PCT international publication WO 03/057427 A1 by the applicant of the present application.

The desired body position/posture and the floor reaction force moment about the desired ZMP are corrected by the full model correction in S39. Thus, the instantaneous values of all constituent elements of the desired gait finally output by the gait generator 100 are obtained. Incidentally, the full model correction may be omitted.

The processing of S01 to S39 explained above is the processing carried out for each calculation processing cycle of the gait generator 100.

The following explains the processing for correcting a moving plan in S01, the explanation of which has been postponed.

When the robot 1 is traveling while pushing the object 120, if a step (a convex portion on a floor) not expected in a current moving plan (e.g., a moving plan as per the aforesaid traveling request) is encountered or if an unexpected external force acts on the object 120 from something other than the robot 1, then a deviation of a real object motion trajectory (hereinafter referred to as the actual object motion trajectory) from a desired object motion trajectory based on a moving plan increases. Meanwhile, the gait generator 100 determines a gait parameter or the like on the basis of a desired object motion trajectory to generate a gait, so that if the deviation of an actual object motion trajectory from a desired object motion trajectory becomes excessive, then it is difficult to generate a gait that allows continual stability of the robot 1 to be secured. Hence, in S01 in the present embodiment, if the deviation reached a certain degree (or if it is expected to increase), then the moving plan determined in S01 is corrected in real time.

The following will explain a specific example of the processing with reference to FIGS. 18(a) and (b). For instance, it is assumed that a current moving plan (before corrected) is a schedule for moving the object 120 at a constant velocity in the positive direction of the X axis. At this time, a desired object position trajectory of a desired object motion trajectory (a time series of instantaneous values) calculated in S35 as described above on the basis of the moving plan before a correction (hereinafter referred to as the before-correction moving plan) will be approximately the trajectory as shown by a graph g6 in FIG. 18(a). Here, it is assumed that the actual object 120 stops at time t1 by being caught by a step (a convex portion) of a floor, which is not expected in the before-correction moving plan. At this time, the trajectory of the actual object position (the time series of the actual object positions estimated in S33) will be a trajectory as shown by a graph g7 in FIG. 18(a). In this case, after time t1, the difference between the desired object position based on the before-correction moving plan and the actual object position will increase as time elapses.

Hence, in S01, the magnitude (the absolute value) of an object position error (a difference between an actual object position and a desired object position) determined in S35 at, for example, a last calculation processing cycle, that is, the object position error determined by the subtractor 254 in FIG. 17, is compared with a predetermined value. Then, when the magnitude of the object position error increases to be larger than the predetermined value (time t2 in FIG. 18(a)), the before-correction moving plan is corrected so as to restrain the increase in the object position error, as indicated by a graph g8 in FIG. 18(a). The corrected moving plan will be hereinafter referred to as the after-correction moving plan. In the example shown in FIG. 18(a), the after-correction moving plan will be a moving plan in which the moving velocity of the object 120 is gradually decelerated after time t2 until the moving velocity reaches substantially zero. The after-correction moving plan is desirably determined such that a desired object motion defined thereby will smoothly continue without causing a sudden change relative to the before-correction moving plan.

Thus, correcting a moving plan as described above makes it possible to generate a gait that allows continual stability of the robot 1 to be secured without causing a desired object reaction force to become excessive.

Further, in the processing of S01 in the present embodiment, a moving plan is corrected so as to bring an after-correction moving plan close to a before-correction moving plan when an actual object position follows better a desired object position trajectory based on the after-correction moving plan after the moving plan has been corrected as described above, causing the difference between a desired object motion trajectory and an actual object motion trajectory to be reduced to a certain degree. The moving plan after the correction will be hereinafter referred to as an after-recorrection moving plan.

The following will explain by taking, as an example, a case where the after-correction moving plan has been determined as shown in FIG. 18(a). When the object 120 rides over a step (time t3 in FIG. 18(b)), the actual object position trajectory will approximate the desired object position trajectory g8 based on the after-correction moving plan, as indicated by the graph g7 in FIG. 18(b).

At this time, in S01, when the object position error reduces to be smaller than the predetermined value (time t4 in FIG. 18(b)), the after-correction moving plan is recorrected such that the moving velocity of the object 120 approximates the moving velocity of the object 120 based on the original before-correction moving plan, as indicated by a graph g9 in FIG. 18(b), thus determining an after-recorrection moving plan. In the example of FIG. 18(b), the after-recorrection moving plan will be a moving plan in which the moving velocity of the object 120 is gradually increased until the moving velocity of the object 120 substantially agrees with the moving velocity based on the original before-correction moving plan after time t4. The after-recorrection moving plan is desirably determined such that the desired object motion defined thereby smoothly continues without causing a sudden change relative to the after-correction moving plan.

In the example described above, the moving velocity of the object 120 based on the after-recorrection moving plan has been brought close to the moving velocity based on the before-correction moving plan; it is also possible, however, to bring the desired object position trajectory based on the after-recorrection moving plan close to the object position trajectory based on the before-correction moving plan.

The above has described in detail the processing by the gait generator 100 in the present embodiment.

The following will explain processing other than that carried out by the gait generator 100 of the control unit 60. This processing is the same as that proposed in the first embodiment in Japanese Patent Laid-Open H10-230485, as previously mentioned, so that only a schematic explanation thereof will be given.

A desired body position/posture trajectory, a desired ZMP trajectory, and a desired object reaction force trajectory of a desired gait generated by the gait generator 100 are input to an object reaction force balance controller 102. The object reaction force balance controller 102 calculates a compensating total floor reaction force for object reaction force balance control to correct a desired floor reaction force moment about a desired ZMP so as to cancel (bring close to zero) the difference between a desired object reaction force and an actual object reaction force, which is the reaction force received by the actual robot 1 from the object 120, and also determines corrected desired body position/posture obtained by correcting the desired body position/posture of a desired motion. The processing of the object reaction force balance controller 102 will be discussed later.

Further, a desired foot position/posture trajectory, a desired ZMP trajectory, and a desired total floor reaction force trajectory of a desired gait are supplied to the leg main controller 104. The leg main controller 104 further receives corrected desired body position/posture and a compensating total floor reaction force for object reaction force balance control from the object reaction force balance controller 102. The leg main controller 104 controls the joint actuators (electric motors) of the legs 2, 2 by compliance control processing so as to follow a motion (excluding motions of the arms 5, 5) and a floor reaction force of a desired gait. More specifically, in order to restore a detection value (actual body posture) of the posture sensor 54 to a corrected desired body posture, a restoring total floor reaction force to be generated at a desired ZMP is calculated, and desired foot position/posture are corrected such that an actual total floor reaction force moment component (this being determined from a detection value of the six-axis force sensor 50 of each of legs 2, 2) acting on the desired ZMP agrees with a moment component of a resultant force of the restoring total floor reaction force, the desired total floor reaction force, and the compensating total floor reaction force for object reaction force balance control. The desired foot position/posture that have been corrected are referred to as the corrected desired foot position/posture. Then, the leg main controller 104 controls the joint actuators of both legs 2, 2 (outputs a motor drive command of each leg 2 to each joint actuator) such that actual joint displacements follow the desired joint displacements of both legs 2, 2 determined from the corrected desired foot position/posture and the corrected desired body position/posture.

Further, a desired hand position/posture trajectory and a desired object reaction force trajectory of a desired gait are input to the arm main controller 106. The arm main controller 106 further receives corrected desired body position/posture from the object reaction force balance controller 102. The arm main controller 106 controls the joint actuators (electric motors) of the arms 5, 5 by the compliance control processing so as to follow the desired hand position/posture trajectory and the desired object reaction force trajectory. More specifically, the desired hand position/posture are corrected on the basis of a difference between a detection value of the six-axis force sensor 52 (actual object reaction force) and a desired object reaction force. The desired hand position/posture that have been corrected are referred to as the final corrected desired hand position/posture. Then, the arm main controller 106 controls the joint actuators of both arms 5, 5 (outputs a motor drive command for each arm 5 to each joint actuator) such that actual joint displacements follow the desired joint displacements of both arms 5, 5 determined from the final corrected desired hand position/posture and the corrected desired body position/posture.

The processing by the object reaction force balance controller 102 will be explained below more specifically. FIG. 19 is a block diagram functionally showing the processing by the object reaction force balance controller 102.

In the object reaction force balance controller 102, an object reaction force moment error, which is a difference between a desired object reaction force moment about a desired ZMP attributable to a desired object reaction force and an actual object reaction force moment about a desired ZMP attributable to an actual object reaction force, is first calculated by a moment error calculator 270. In this case, the desired object reaction force moment is calculated from a desired object reaction force and a desired ZMP output from the gait generator 100 and a final corrected desired hand position/posture (more specifically, the values at the last time control processing cycle) determined by the arm main controller 106. Further, the actual object reaction force moment is calculated from a detection value of the six-axis force sensor 52 (actual object reaction force), a desired ZMP, and final corrected desired hand position/posture (more specifically, the values at the last time control processing cycle).

Based on the above object reaction force moment error, a desired center-of-gravity position perturbation amount, which is a desired perturbation amount of a total center-of-gravity position of the robot 1, is calculated by a center-of-gravity position perturbation amount calculator 272. The desired center-of-gravity position perturbation amount has a meaning as a perturbation amount of the total center-of-gravity of the robot 1 to cancel, in the long term, an object reaction force moment error by the gravity acting on the robot 1, and it is determined to be, for example, a value that is proportional to an object reaction force moment. Subsequently, a difference between a total center-of-gravity position model perturbation amount, which is a perturbation amount of the total center-of-gravity of the robot 1 on the perturbation dynamic model, which is calculated using the perturbation dynamic model to be discussed later, and the aforesaid desired center-of-gravity position perturbation amount is calculated by the subtractor 274. Based on this difference, a compensating total floor reaction force moment for object reaction force balance control, which is a moment manipulated variable about a desired ZMP, for converting the difference to zero is calculated by a feedback control law 276, e.g., the PD control law. Further, the sum of compensating total floor reaction force moment for object reaction force balance control and the aforesaid object reaction force moment error is calculated by an adder 278. Then, an output of the adder 278 is input to a perturbation dynamic model 280 that indicates a relationship between a perturbation of the total center-of-gravity of the robot 1 and a perturbation of a moment about a desired ZMP and a relationship between the perturbation of the total center-of-gravity and the perturbation of body position/posture, and this perturbation dynamic model calculates a body position/posture perturbation amount.

In this case, the perturbation dynamic model is a model that describes the relationship (dynamic relationship) between a perturbation of the total center-of-gravity of the robot 1 and a perturbation of a moment about a desired ZMP according to the following expression 18.

$$m\text{total}*hG*d2\Delta xG/dt2 = \Delta xG*m\text{total}*g + \Delta Mx \qquad \text{Expression 18}$$

where hG denotes the height from a desired ZMP to the total center-of-gravity; $\Delta xG$ denotes a perturbation amount of the total center-of-gravity in the horizontal direction; and $\Delta Mx$ denotes a moment horizontal component about the desired ZMP. Other variables are the same as those defined related to the aforesaid robot simplified model. Expression 18 is an expression on a sagittal plane, and a relational expression on a lateral plane may be obtained by reversing the sign of the second term of the right side of Expression 18.

This Expression 18 is an expression showing a dynamic behavior of an inverted pendulum having a mass point of the total mass mtotal of the robot 1, the horizontal component of a moment generated about a desired ZMP, which is a supporting point of the mass point, being denoted by $\Delta Mx$.

Further, the relationship between the perturbation amount $\Delta xG$ of a total center-of-gravity position of the robot 1 and the perturbation amount of a body position (hereinafter denoted as $\Delta xb$) is represented by Expression 19 given below.

$$\Delta xb = k*\Delta xG \qquad \text{Expression 19}$$

where k denotes a proportionality constant. Therefore, $\Delta xb$ is proportional to $\Delta xG$. For a perturbational motion, Expression 19 may be considered to approximately hold.

Thus, in the perturbation dynamic model 280, an output of the adder 278 is used as $\Delta Mx$ of the right side of Expression 18 to calculate the perturbation amount $\Delta xG$ of the total center-of-gravity, and from the determined $\Delta xG$, a body position perturbation amount is determined according to Expression 19. In the present embodiment, a corrected desired body posture of corrected desired body position/posture agrees with a desired body posture, and the perturbation amount of the body posture is zero.

In the object reaction force balance controller 102, the corrected desired body position/posture are calculated by adding the body position perturbation amount output from the perturbation dynamic model 280, as described above, to the desired body position/posture (the output of the gait generator 100) by an adder 282.

The above has described the specific calculation processing of the object reaction force balance controller 102.

A current time's gait is generated such that the current time's gait converges to a normal gait, taking an object reaction force into account, by the operation of the first embodiment, especially the processing carried out by the gait generator 100, explained above. Hence, an operation, such as pushing the object 120, by the robot 1 can be smoothly performed while securing continual stability of the robot 1. Furthermore, to finally determine a desired object position and a desired object reaction force by the gait generator 100, the aforesaid processing in S35 is carried out to determine the desired object position, which is an output of the object dynamic model 2, such that the difference between the desired object position and an actual object position approximates zero as much as possible (such that the difference between the desired object position and an actual object position is minimized) while determining the desired object reaction force, which is an input to the object dynamic model 2, such that an object model velocity as a motion state amount of the object 120 on the object dynamic model 2 follows the desired object velocity in a desired object motion trajectory based on a moving plan. Hence, a behavior of the object dynamic model 2 will not differ much from a behavior of the actual object 120, making it possible to determine the desired object position and the desired object reaction force while implementing the matching with the behavior of the actual object 120. As a result, it is possible to avoid a situation wherein a gait that causes the robot 1 to perform an unreasonable motion is determined, thus permitting enhanced stability of the behaviors of the robot 1 to be achieved.

Second Embodiment

A second embodiment of the present invention will now be explained with reference to FIG. 20. In the explanation of the second embodiment, the like components or the like functional portions as those in the first embodiment will use the like reference numerals as those in the first embodiment, and the explanation thereof will be omitted. The second embodiment is an embodiment of the first to the fourth aspects of the present invention.

The second embodiment differs from the first embodiment only in the processing for correcting a moving plan in S01 of FIG. 5. This will be explained below. A situation in which the difference between an actual object motion trajectory and a desired object motion trajectory based on a moving plan increases occurs if a relatively large change takes place in a disturbance force other than a force acting on the robot 1 of a force acting on an actual object 120.

Hence, according to the second embodiment, instead of correcting a moving plan on the basis of an object position error as explained in the first embodiment, the moving plan is corrected on the basis of a change in, for example, the estimated disturbance force. Other than this, the second embodiment is the same as the first embodiment. Supplementally, the processing in S01 in the present embodiment corresponds to the moving plan correcting means in the second aspect of the invention.

The following will explain a specific example. For instance, in the case of the example shown in FIG. 18(a) described above, the estimated disturbance force (the component in the X-axis direction) calculated in the aforesaid S35 suddenly increases in the negative direction after time t1 at which the object 120 is caught by a step, as shown in FIG. 20(a). Hence, in the second embodiment, the before-correction moving plan is corrected to determine an after-correction moving plan, as explained in the first embodiment in relation to FIG. 18(a), when a change in the estimated disturbance force exceeds a predetermined value (at time t5 in FIG. 20(a)).

Further, in the case of the example shown in FIG. 18(b), after time t3 when the object 120 has ridden over the step, the estimated disturbance force (the component in the X-axis direction) calculated in S35 mentioned above returns to substantially the same value as an original value before time t1, as shown in FIG. 20(b). Thus, when the estimated disturbance force changes by the predetermined value or more and then returns to the value approximating the original value (time t6 in FIG. 20(b)), the after-correction moving plan is corrected to determine an after-recorrection moving plan, as explained in the first embodiment in relation to FIG. 18(b).

The processing other than that explained above is the same as the processing in the aforesaid first embodiment.

The second embodiment also provides operations and advantages similar to those of the first embodiment.

Supplementally, in the second embodiment, a moving plan has been corrected on the basis of a change in an estimated disturbance force; alternatively, however, the moving plan may be corrected when a difference between an actual object reaction force grasped from detection values of the six-axis force sensors 52 of both arms 5, 5 and a desired object reaction force determined in S35 has increased to be larger than a predetermined value.

Third Embodiment

A third embodiment of the present invention will now be explained with reference to FIG. 21 to FIG. 23. In the explanation of the third embodiment, the like components or the like functional portions as those in the first embodiment will use the like reference numerals as those in the first embodiment, and the explanation thereof will be omitted. The third embodiment is an embodiment of the first aspect, the third aspect, and the fourth aspect of the invention.

FIG. 21 is a flowchart showing the processing of a part associated with the processing shown in FIG. 5 related to the first embodiment in the processing by a gait generator 100 in the third embodiment. As shown in FIG. 21, the third embodiment differs from the first embodiment only in the processing carried out when a determination result of S19 is NO.

More specifically, when a determination result of S19 is NO, a desired object reaction force trajectory has been corrected in the first embodiment; the third embodiment replaces this by correcting predicted landing position/posture or predicted landing time of the free leg foot 22 in S21'. This means to correct a foot trajectory parameter of a current time's gait parameter. In this case, the predicted landing position/posture or the predicted landing time is corrected such that a ZMP correction amount will be minimized as much as possible (at least smaller than a ZMP correction amount determined before correcting the predicted landing position/posture or the predicted landing time) when the processing of S07 to S17 is carried out again after the above correction. Then, following the correction, the processing from S07 is carried out again. Other than this, the third embodiment is the same as the first embodiment.

A specific correction example in S21' will be explained below. For instance, it is assumed that, right now, the predicted landing position/posture of the free leg foot 22 of a current time's gait and the predicted landing position/posture of the free leg foot 22 of a next time's gait are determined as indicated by the solid line in FIG. 22. In the illustrated example, a robot 1 is to walk straight substantially at a constant step length in the X-axis direction of a current time's gait supporting leg coordinate system.

Then, the robot 1 approaches an object 120 up to the current time's gait and, from the middle of a next time's gait, the robot 1 begins an operation for pushing the object 120 in the positive direction of the X axis. In this case, a desired object reaction force trajectory is, for example, a stepped trajectory that rises in the middle of a next time's gait, as shown in FIG. 23(a).

At this time, if the processing up to S17 is carried out while maintaining the predicted landing position/posture, as indicated by the solid line in FIG. 22, then a ZMP correction amount (a component in the X-axis direction) determined by the processing in S17 may become relatively large, as indicated by the solid line in, for example, FIG. 23(b), thus causing a determination result of S19 to be NO in some cases.

In this case, the processing in S21' corrects, for example, the predicted landing position/posture of the free leg foot 22 of a next time's gait as indicated by the dashed line in FIG. 22 such that they approach a supporting leg foot 22L of the current time's gait in the X-axis direction. In other words, the predicted landing position/posture of the free leg foot 22L are corrected so as to further reduce the step length of the next time's gait. Carrying out the processing from S05 again after correcting the predicted landing position/posture of the next time's gait as described above causes the ZMP correction amount determined in S17 to become smaller, as indicated by the dashed line in FIG. 23(b). As a result, a determination result of S19 becomes YES. Supplementally, when the predicted landing position/posture of the free leg foot 22L of the next time's gait are corrected, as shown in FIG. 22, the position of the free leg foot at the end of a second turning gait of a normal gait is also brought close to the position of the free leg foot at the start of the second turning gait (the predicted landing position of a free leg foot 22R of the current time's gait) by the method for determining a foot trajectory parameter of a normal gait described above.

In the aforesaid example, the predicted landing position/posture of the free leg foot 22L of the next time's gait have been corrected; however, if there is an allowance to correct the predicted landing position/posture of the free leg foot 22R of the current time's gait, then the predicted landing position/posture may be corrected instead. Alternatively, the predicted landing position/posture in both the current time's gait and the next time's gait may be corrected.

Further, in the example described above, the predicted landing position/posture have been corrected; alternatively, however, the predicted landing time of the free leg foot 22 of at least one of a current time's gait and a next time's gait may be corrected. In the situation shown in FIG. 23, for example, the predicted landing time of the next time's gait may be delayed.

The above has described the third embodiment of the present invention. The third embodiment also provides the same operations and advantages as those of the first embodiment. In the third embodiment, the predicted landing position/posture or the predicted landing time of the free leg foot 22 has been corrected if a determination result of S19 is NO; alternatively, in addition thereto, a desired object reaction force trajectory may be corrected, as in the first embodiment. Alternatively, in S01, the moving plan may be corrected on the basis of an estimated disturbance force, as explained in the second embodiment.

In the first to the third embodiments explained above, the explanation has been given by taking, as an example, the case where the object 120 is pushed and moved by the robot 1. The present invention, however, can be also applied to a case where the object 120 is moved by pulling or a case where the object 120 is moved by lifting.

Further, in the aforesaid embodiments, the interference or the like between the robot 1 and the object 120 has been taken into account, and the desired object motion trajectory (or the desired motion state amount) based on the moving plan of the object 120 has been corrected, as necessary (refer to the processing in FIG. 6). It is also possible, however, to always avoid the interference or the like between a robot and an object by properly setting the predicted landing position and the predicted landing time (more generally, a gait parameter) of each leg of the robot, depending on the method for determining a gait parameter of the robot or the moving mode of the object, or the structure of the robot (especially the structure of a portion to be brought in contact with an object) or the like. And, in such a case, the processing in FIG. 6 may be omitted.

Further, in the aforesaid embodiments, to determine a current time's gait parameter, the gait parameter of a normal gait, which is a cyclic gait, has been determined and then the current time's gait has been converged to the normal gait (to match the terminal divergent component of the current time's gait to initial divergent component of the normal gait); this, however, is not essential in the present invention. According to the present invention, basically, an operation of a robot may be controlled by a technique that is different from the techniques explained in the aforesaid embodiments, as long as the operation of the robot can be controlled such that a desired action force between the robot and an object (a desired object reaction force in the aforesaid embodiments) and a desired moving position of the object (a desired object motion trajectory in the aforesaid embodiments) that have been finally determined are satisfied.

INDUSTRIAL APPLICABILITY

As described above, the present invention is useful as it is capable of causing a robot, such as a bipedal mobile robot, to smoothly perform an operation of moving an object, while securing the stability of the robot at the same time.

BRIEF DESCRIPTION OF THE DRAWINGS

FIG. 21 is a flowchart showing the processing of an essential section of a gait generator in a third embodiment of the present invention.

FIG. 22 is a diagram for explaining the processing in S21' of FIG. 21.

FIGS. 23($a$) and ($b$) are diagrams for explaining the processing in S21' of FIG. 21.

Figure 1:
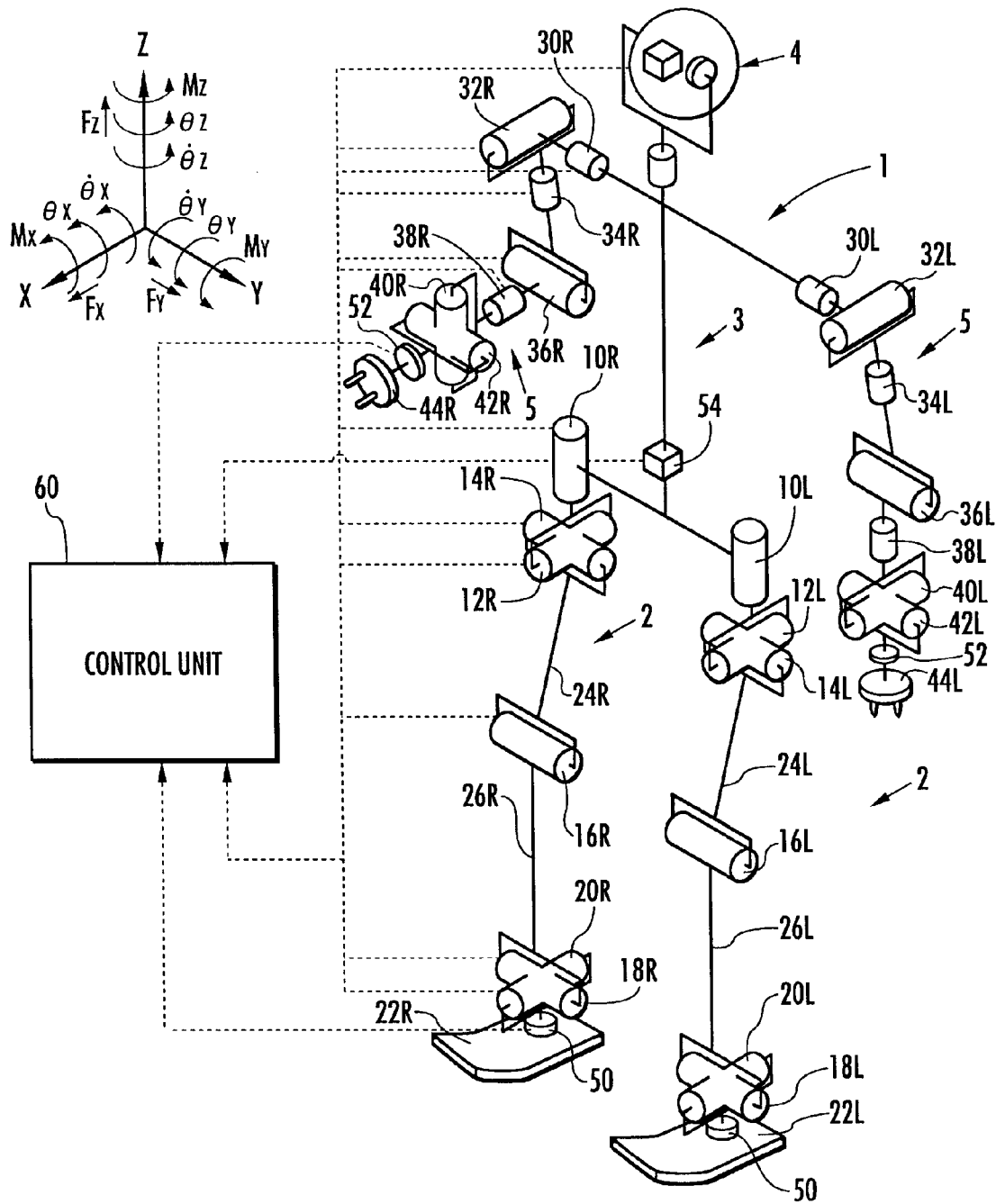
FIG. 1 is a diagram showing a schematic construction of a bipedal moving robot as a legged moving robot in embodiments of the present invention.
Figure 2:
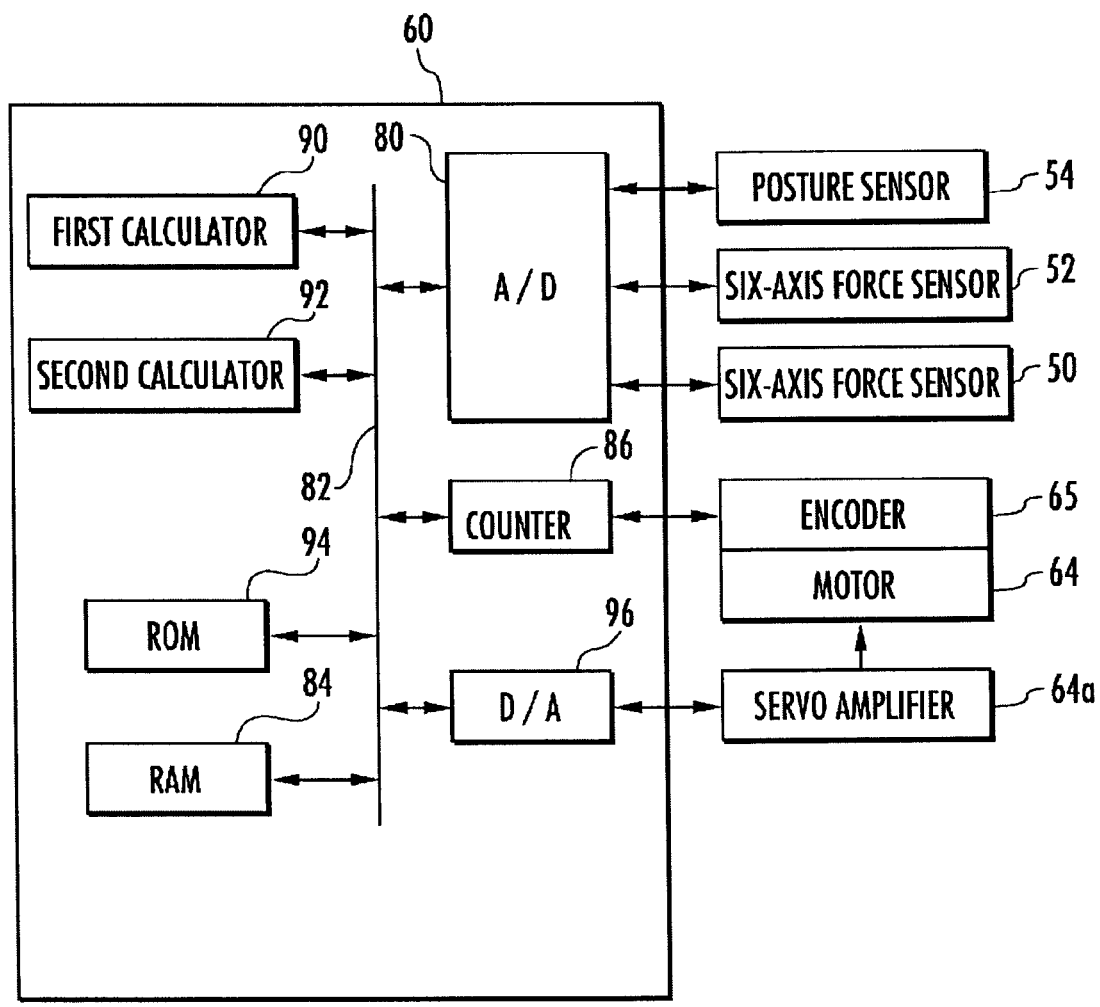
FIG. 2 is a block diagram showing a construction of a control unit provided in the robot shown in FIG. 1.
Figure 3:
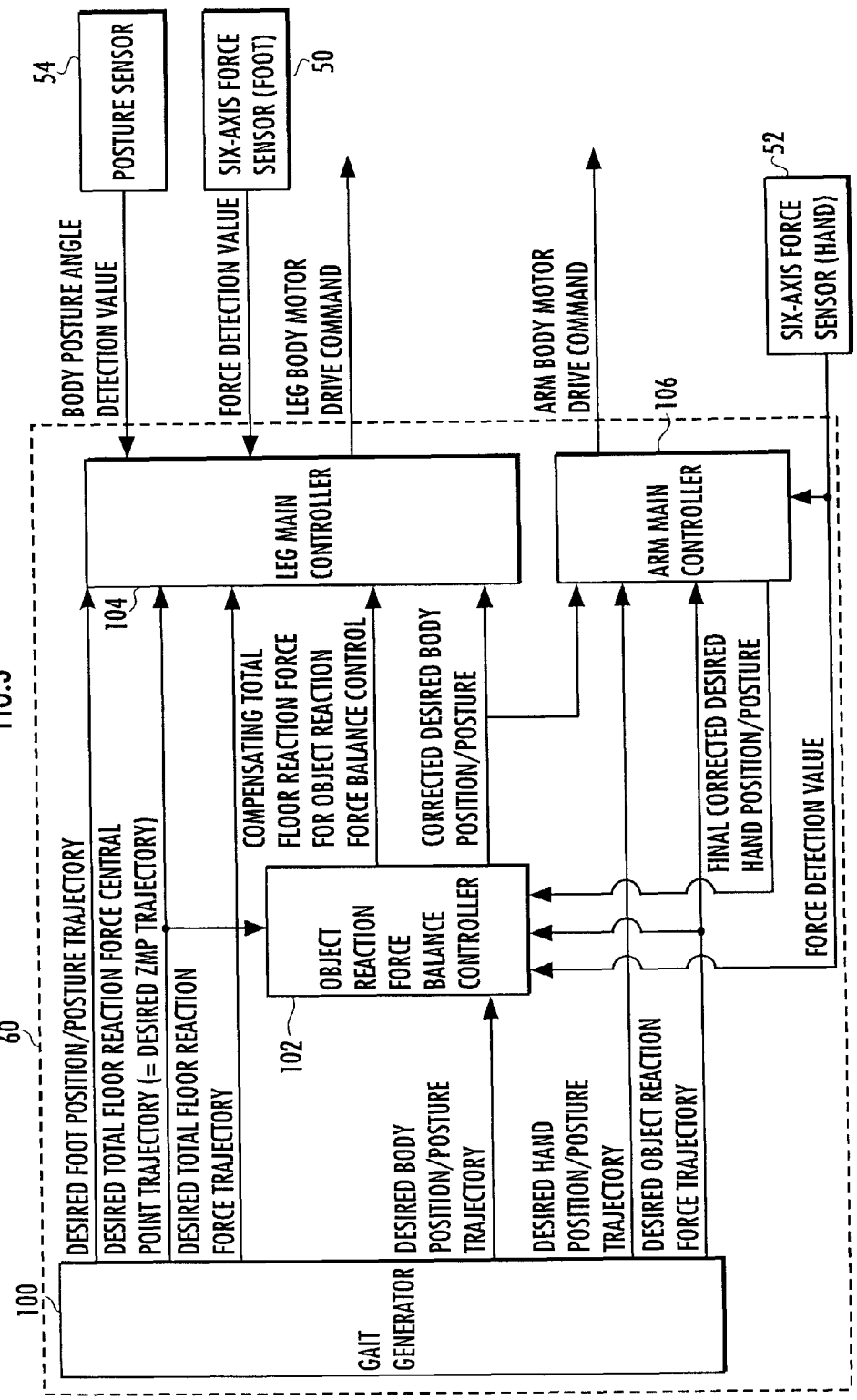
FIG. 3 is a block diagram showing a functional construction of an essential section of the control unit shown in FIG. 2.
Figure 4:
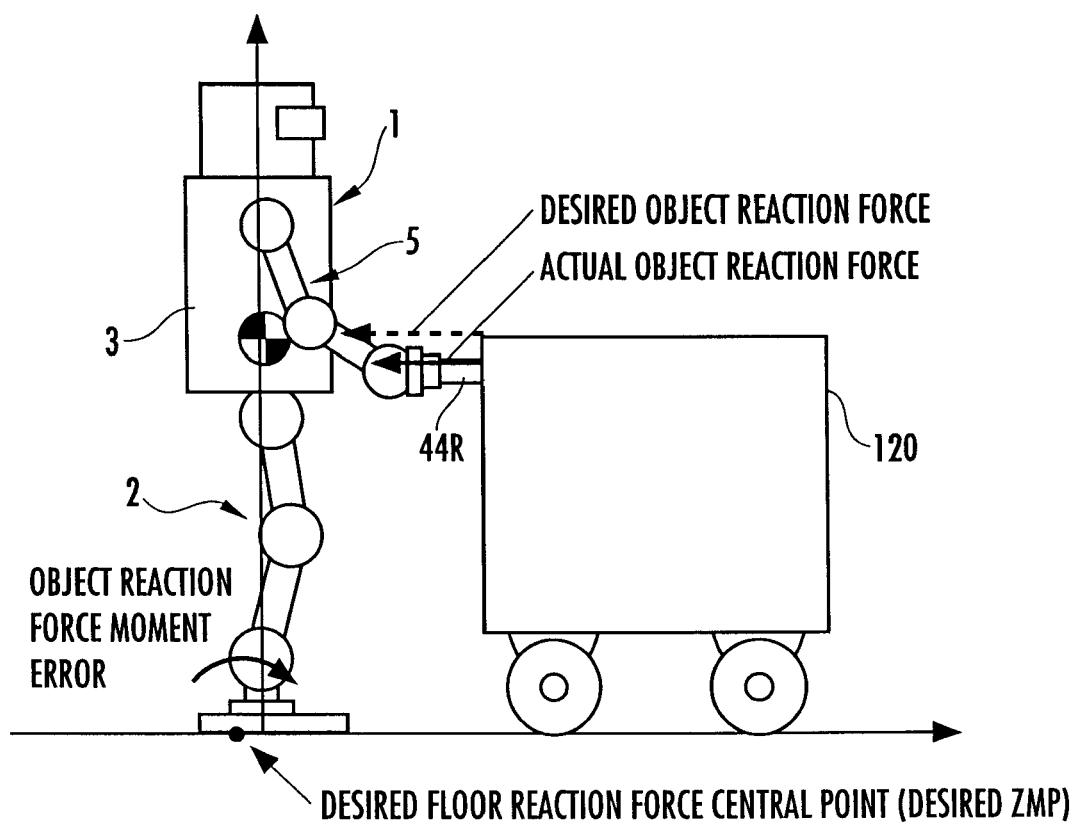
FIG. 4 is a diagram showing a relationship between the robot and an object in the embodiments.
Figure 5:
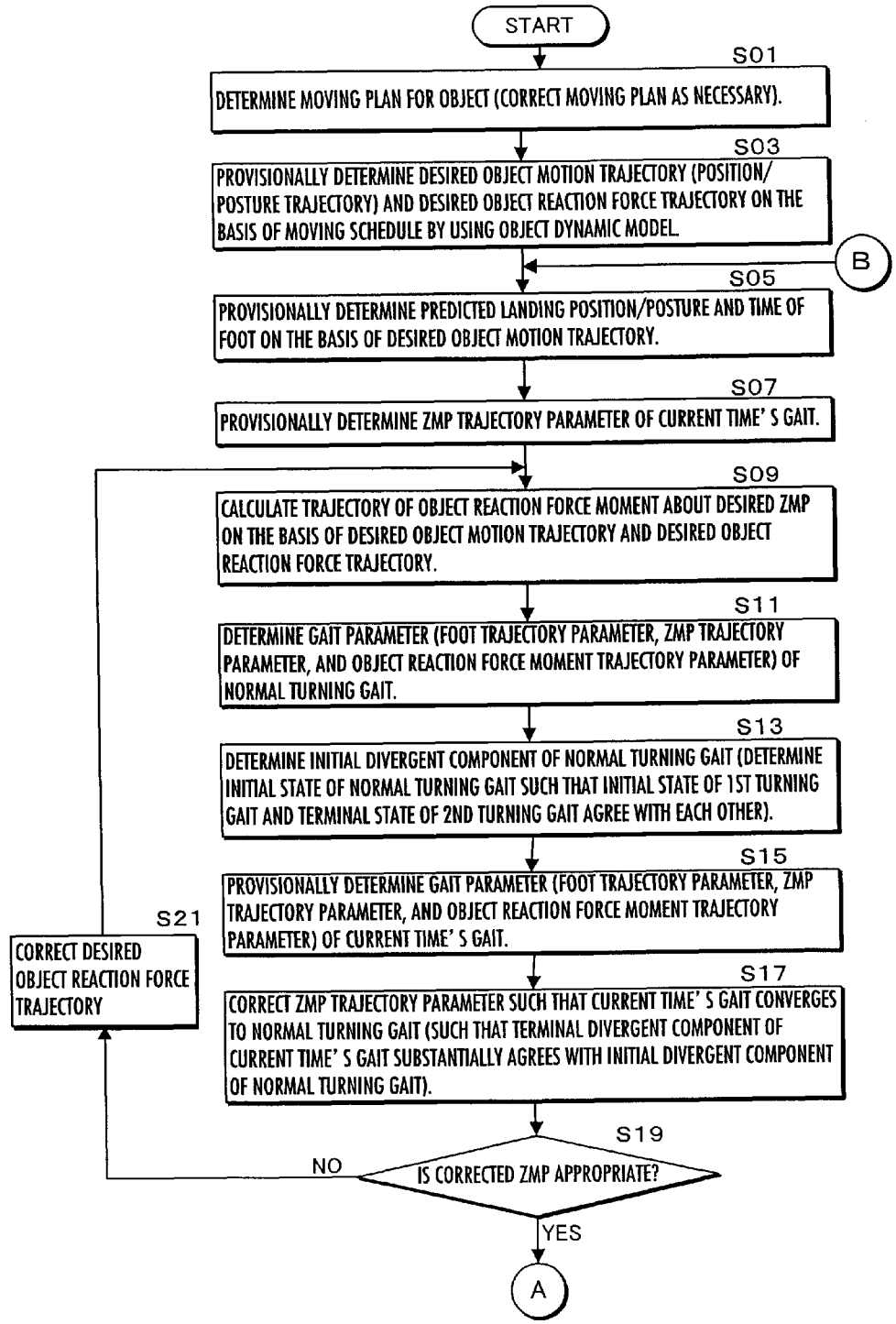
FIG. 5 is a flowchart showing the calculation processing of a gait generator in a first embodiment.
Figure 6:
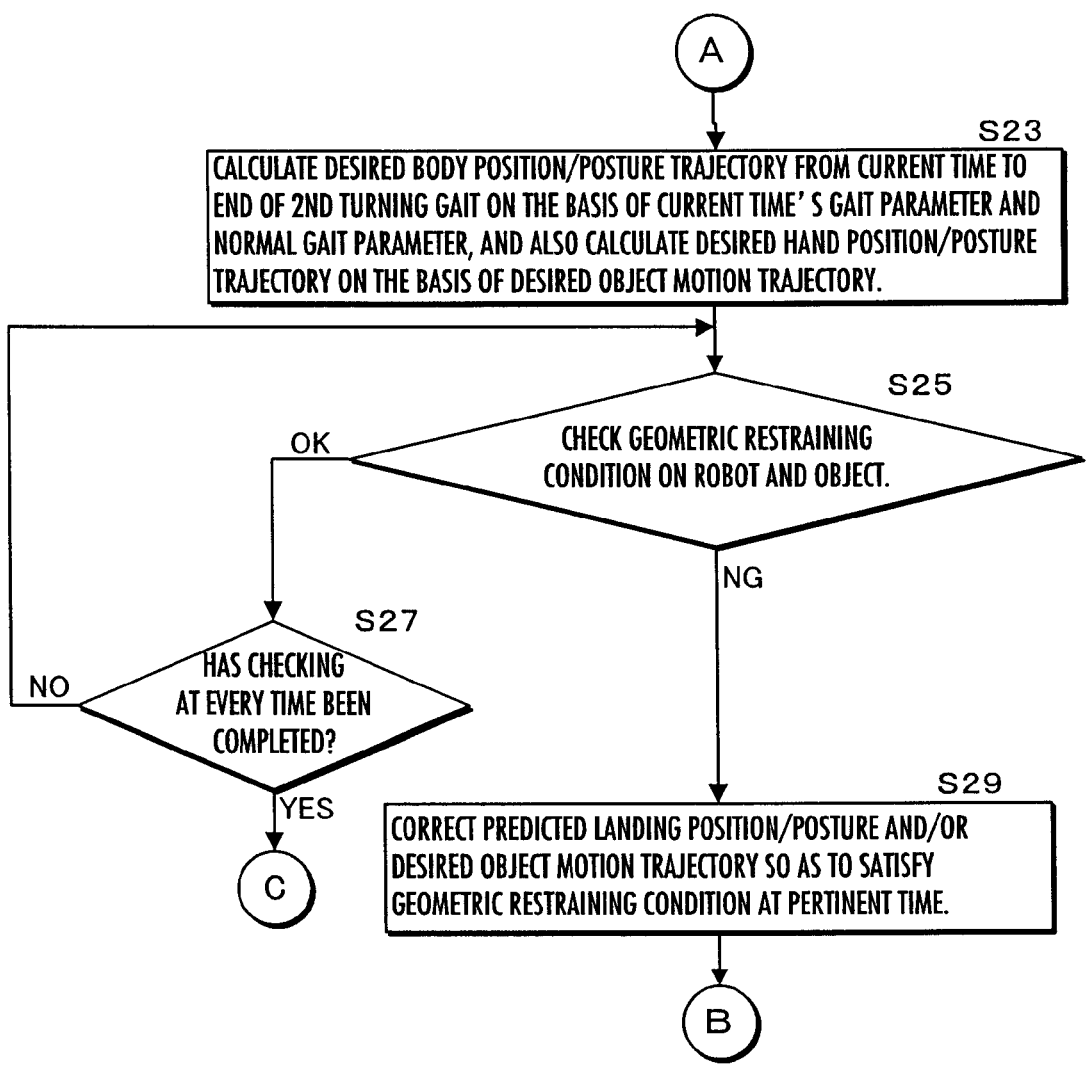
FIG. 6 is a flowchart showing the calculation processing of the gait generator in the first embodiment.
Figure 7:
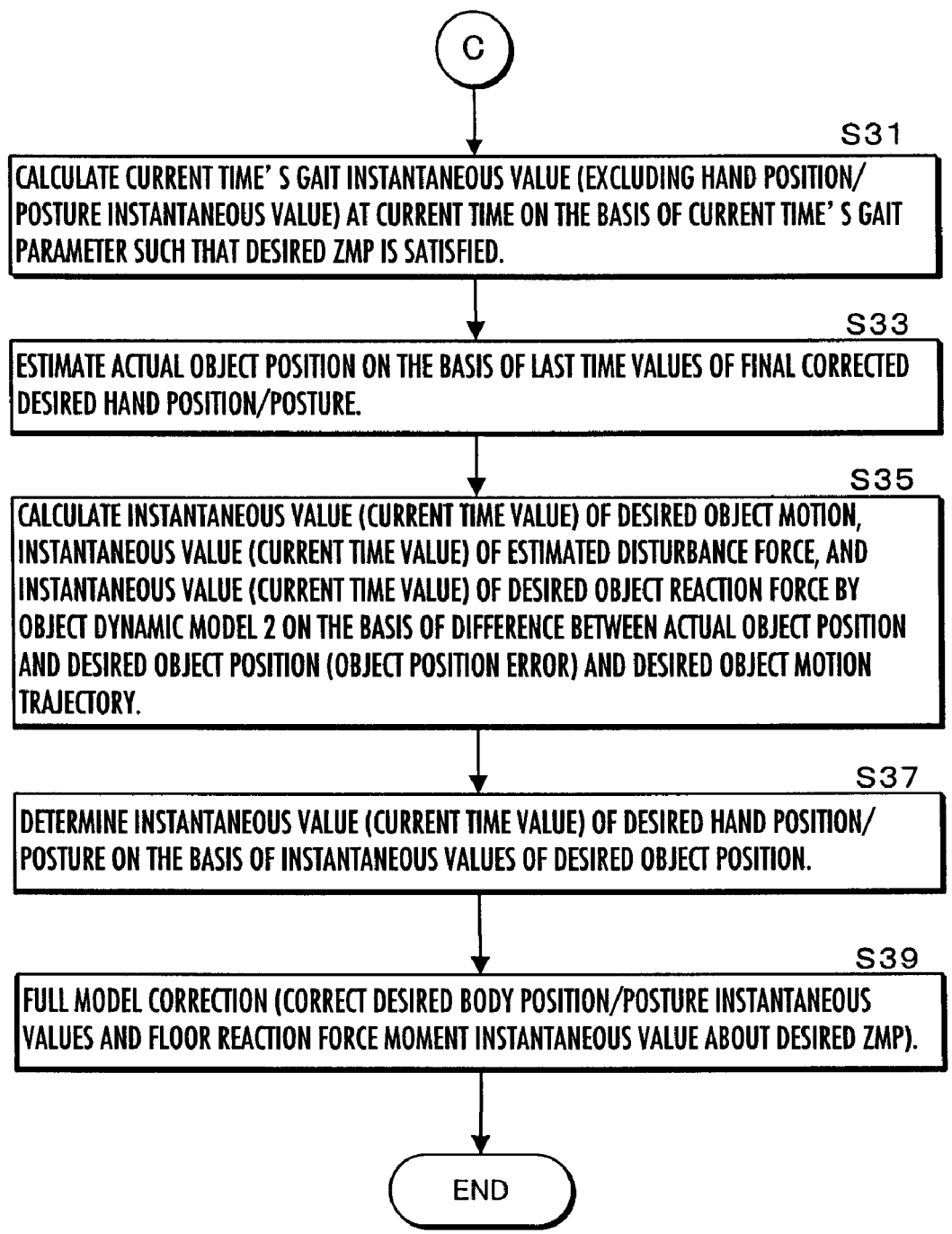
FIG. 7 is a flowchart showing the calculation processing of the gait generator in the first embodiment.
Figure 8:
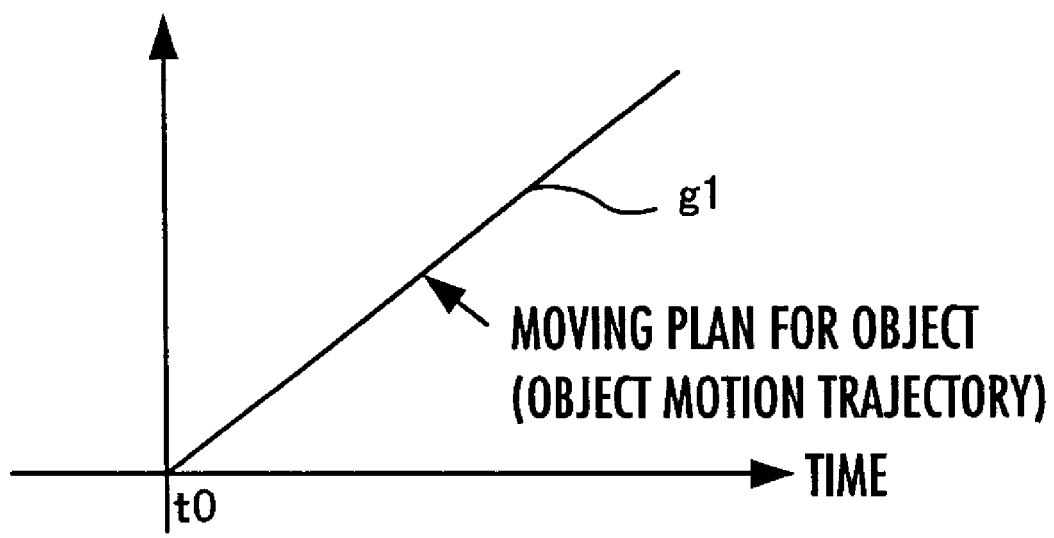
FIG. 8 is a diagram showing an example of a moving plan determined in S02 of FIG. 5.
Figure 9:
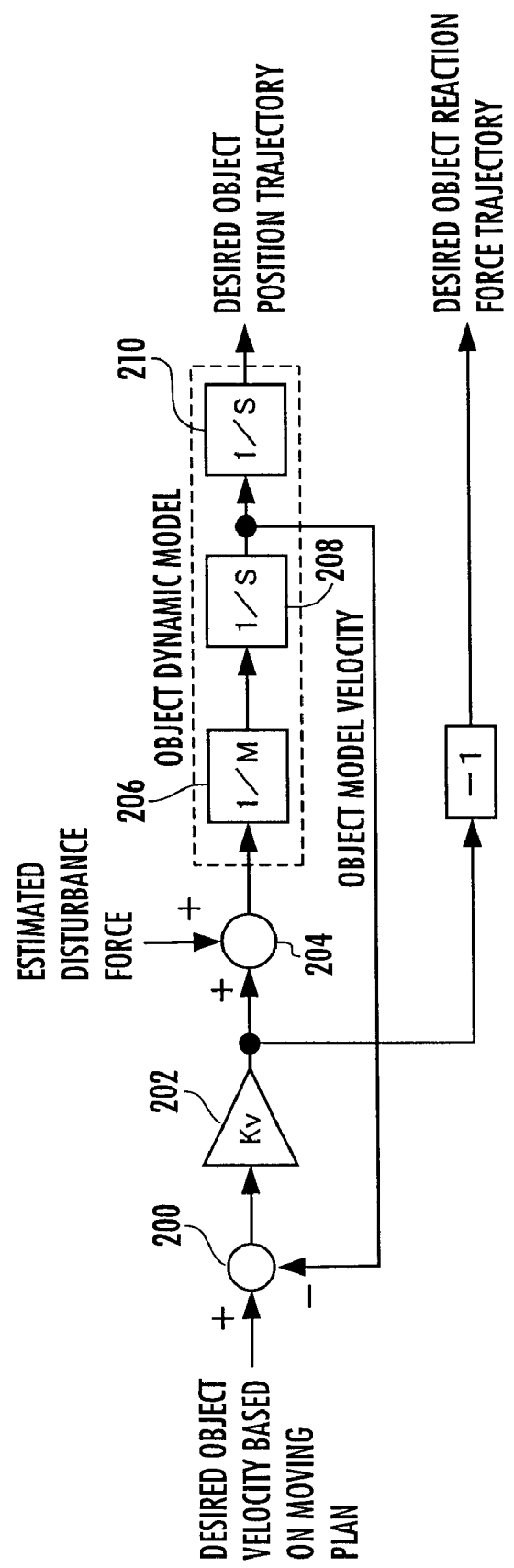
FIG. 9 is a block diagram showing the processing of S02 of FIG. 5.
Figure 10:
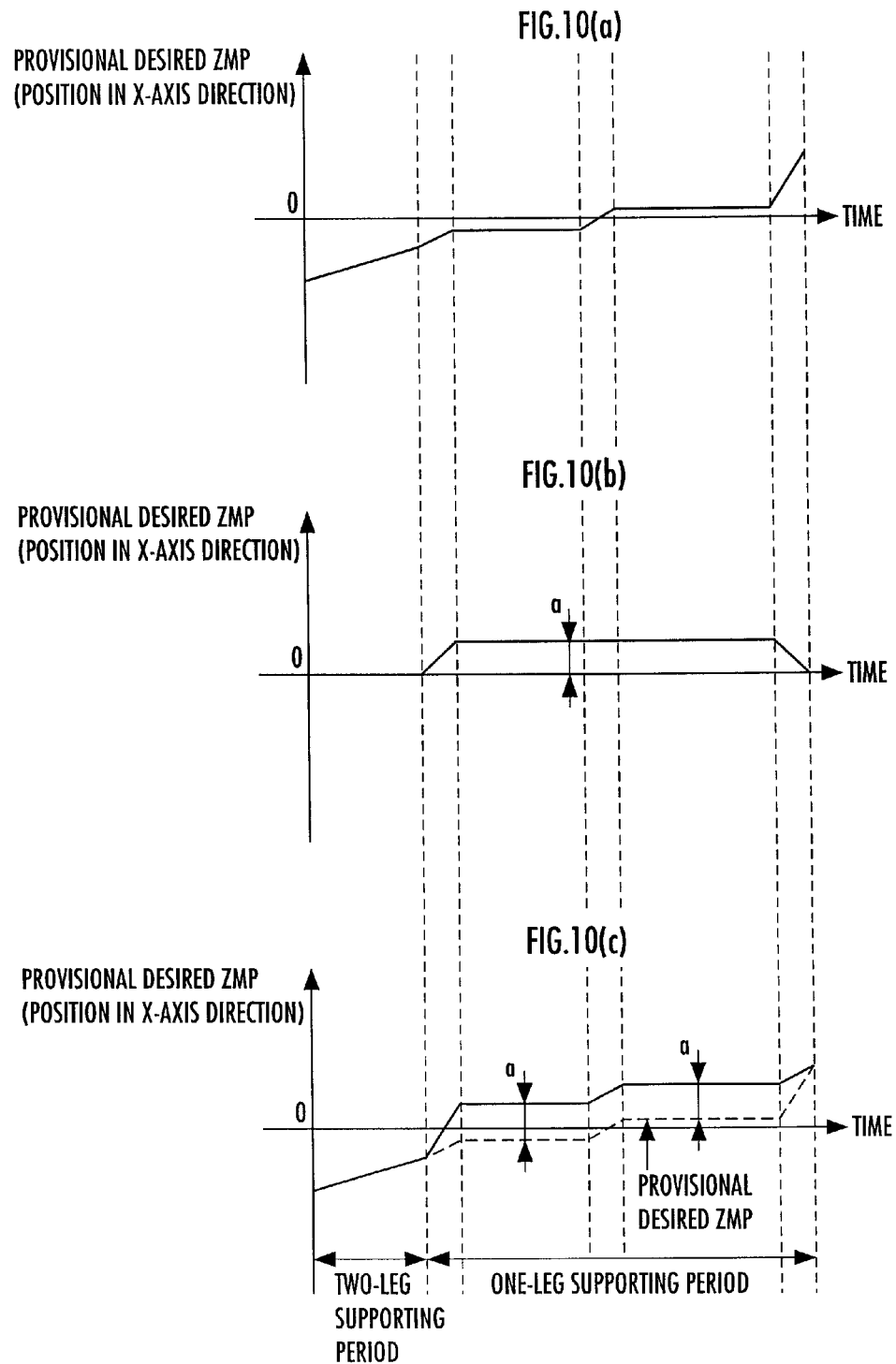
FIG. 10($a$) is a diagram showing an example of a provisional desired ZMP trajectory related to S07 of FIG. 5, FIG. 10($b$) is a diagram showing an example of a ZMP correction amount determined in S17 of FIG. 5, and FIG. 10($c$) is a diagram showing an example of a desired ZMP trajectory corrected in S17.
Figure 11:
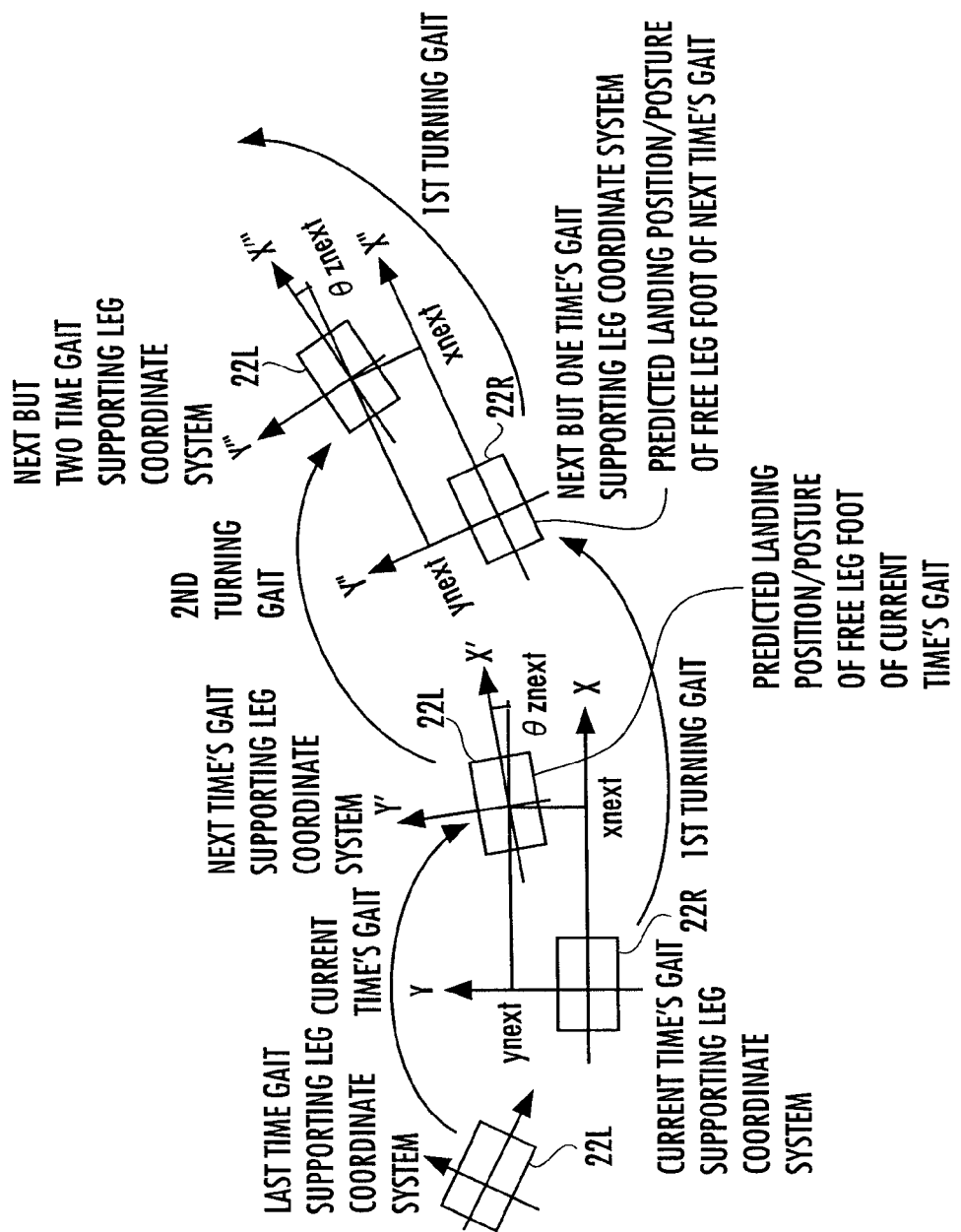
FIG. 11 is a diagram showing an example of a foot trajectory parameter determined in S11 of FIG. 5.
Figure 12A:
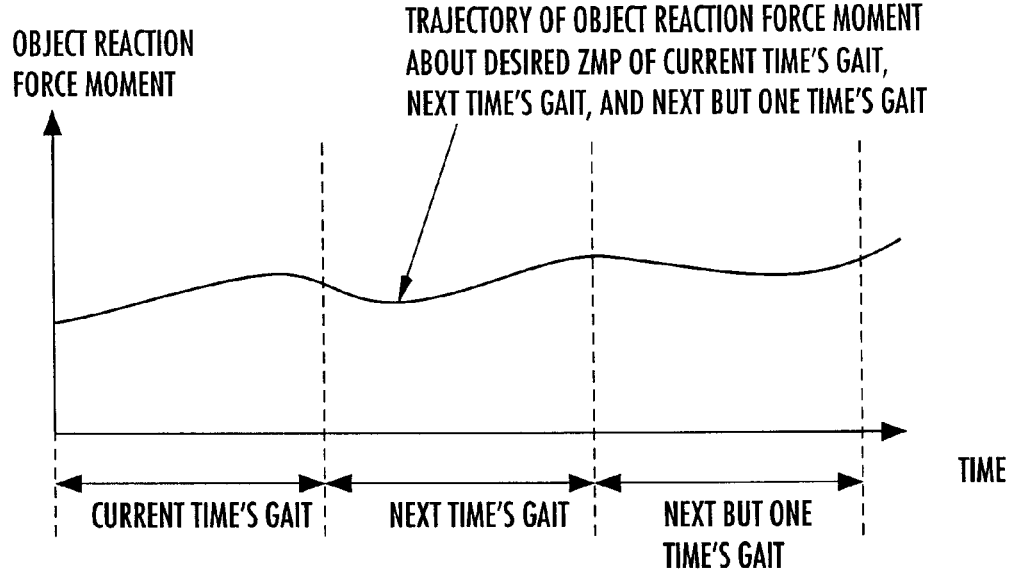
FIG. 12($a$) is a diagram showing an example of an object floor reaction force moment trajectory of a current time's gait, and FIG. 12($b$) is a diagram showing an example of an object reaction force moment trajectory of a normal gait determined in S11 of FIG. 5.
Figure 12B:
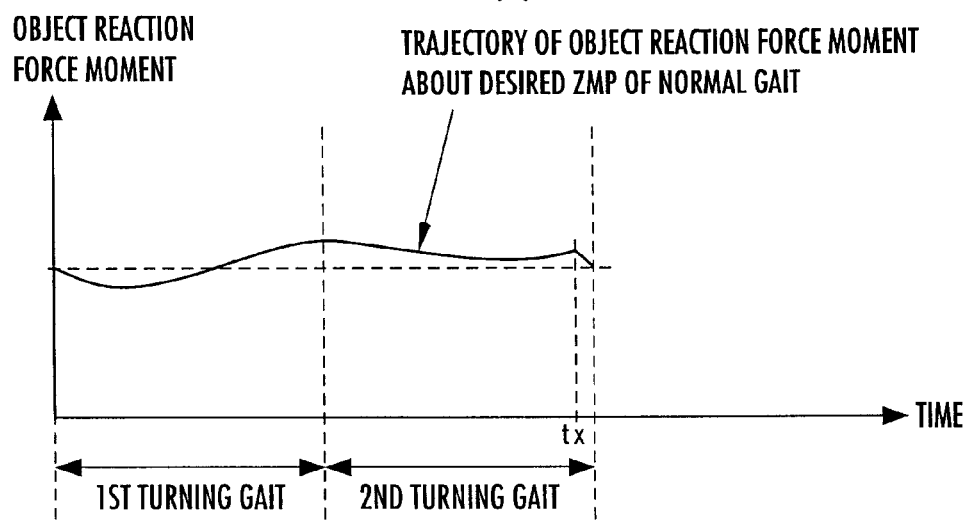
Figure 13:
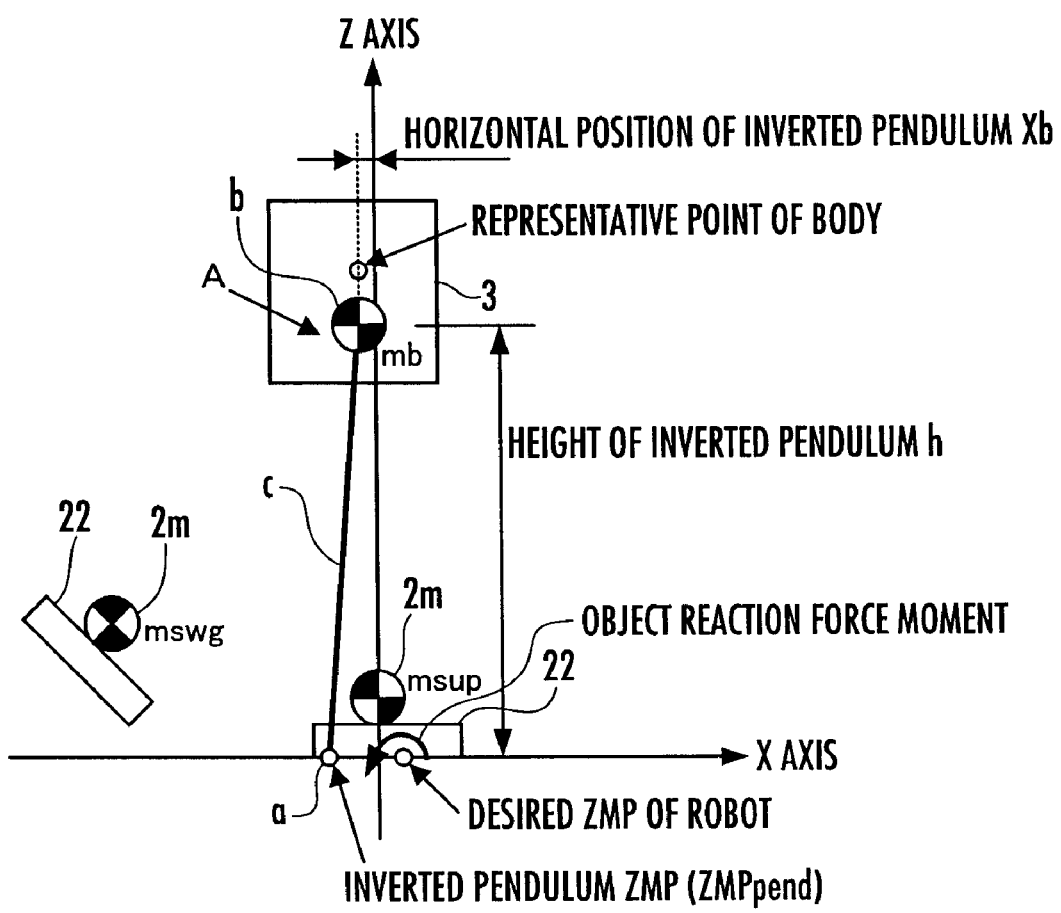
FIG. 13 is a diagram showing an example of a robot dynamic model used in the embodiments.
Figure 14:
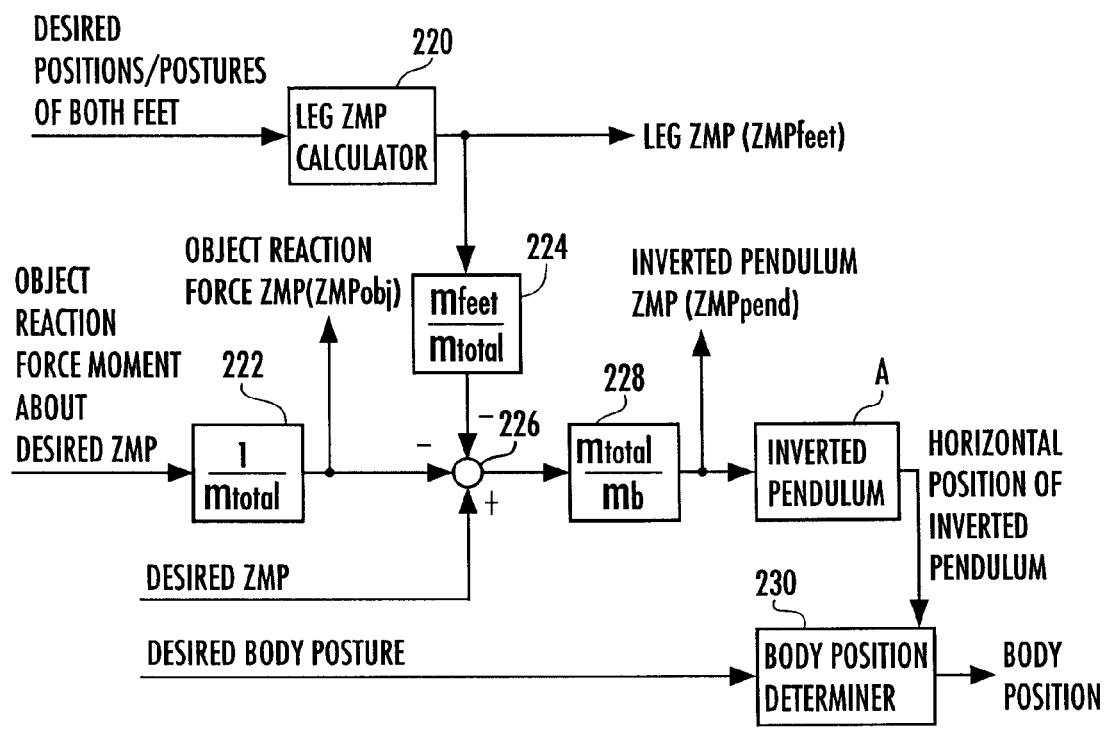
FIG. 14 is a block diagram showing the processing for determining a body position by using the robot dynamic model shown in FIG. 13.
Figure 15A:
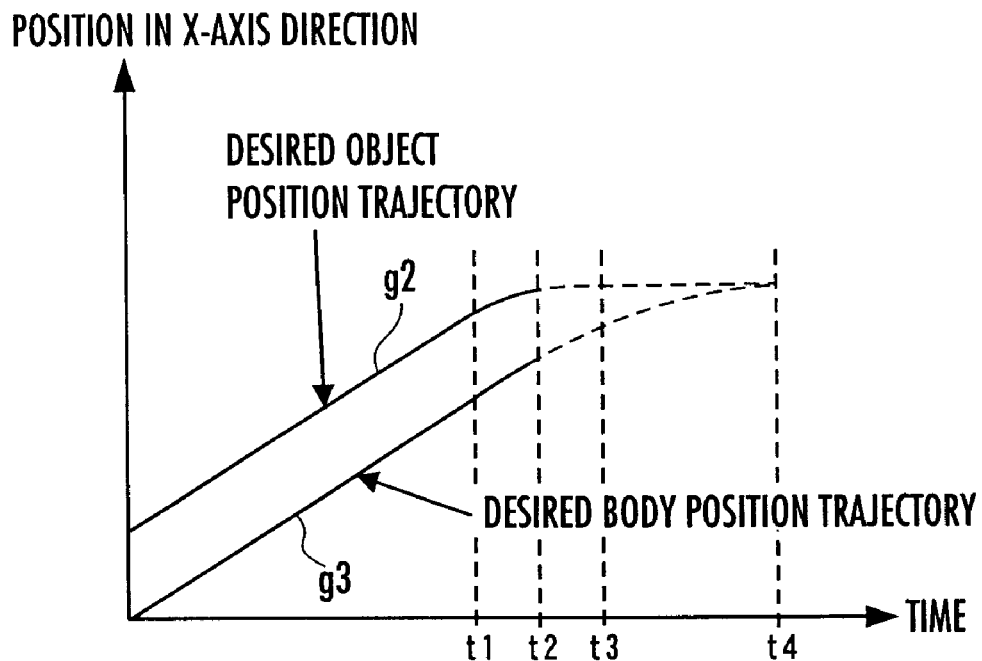
FIGS. 15($a$) and ($b$) are diagrams for explaining the processing in S21 of FIG. 5.
Figure 15B:
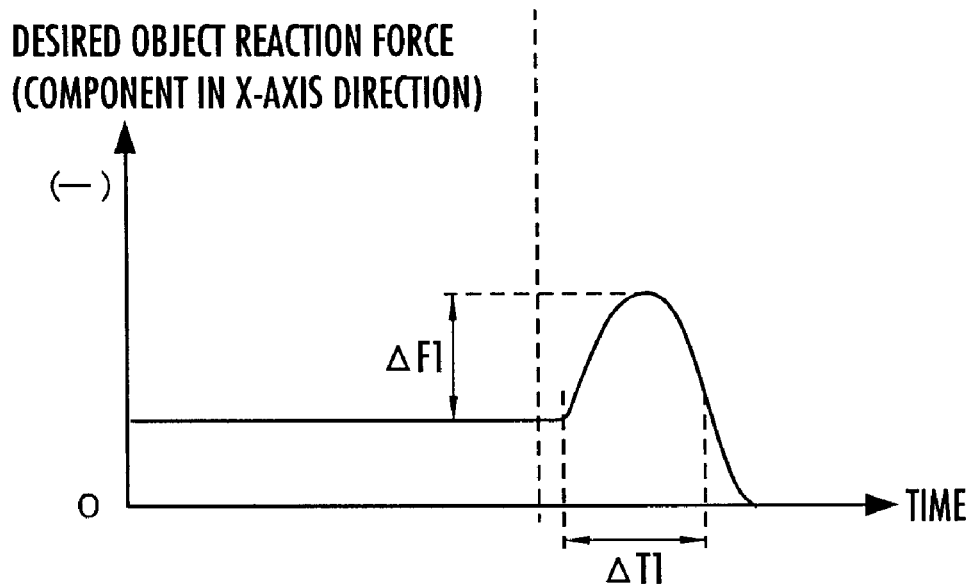
Figure 16:
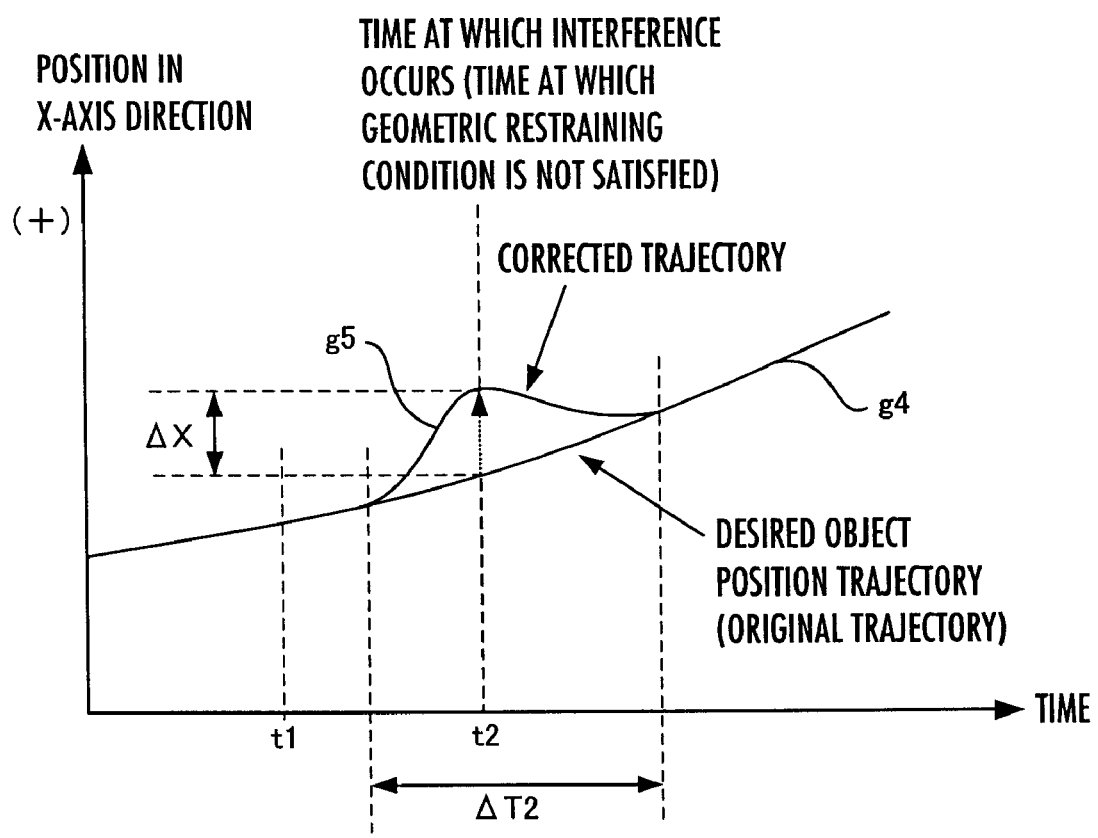
FIG. 16 is a diagram for explaining the processing in S29 of FIG. 6.
Figure 17:
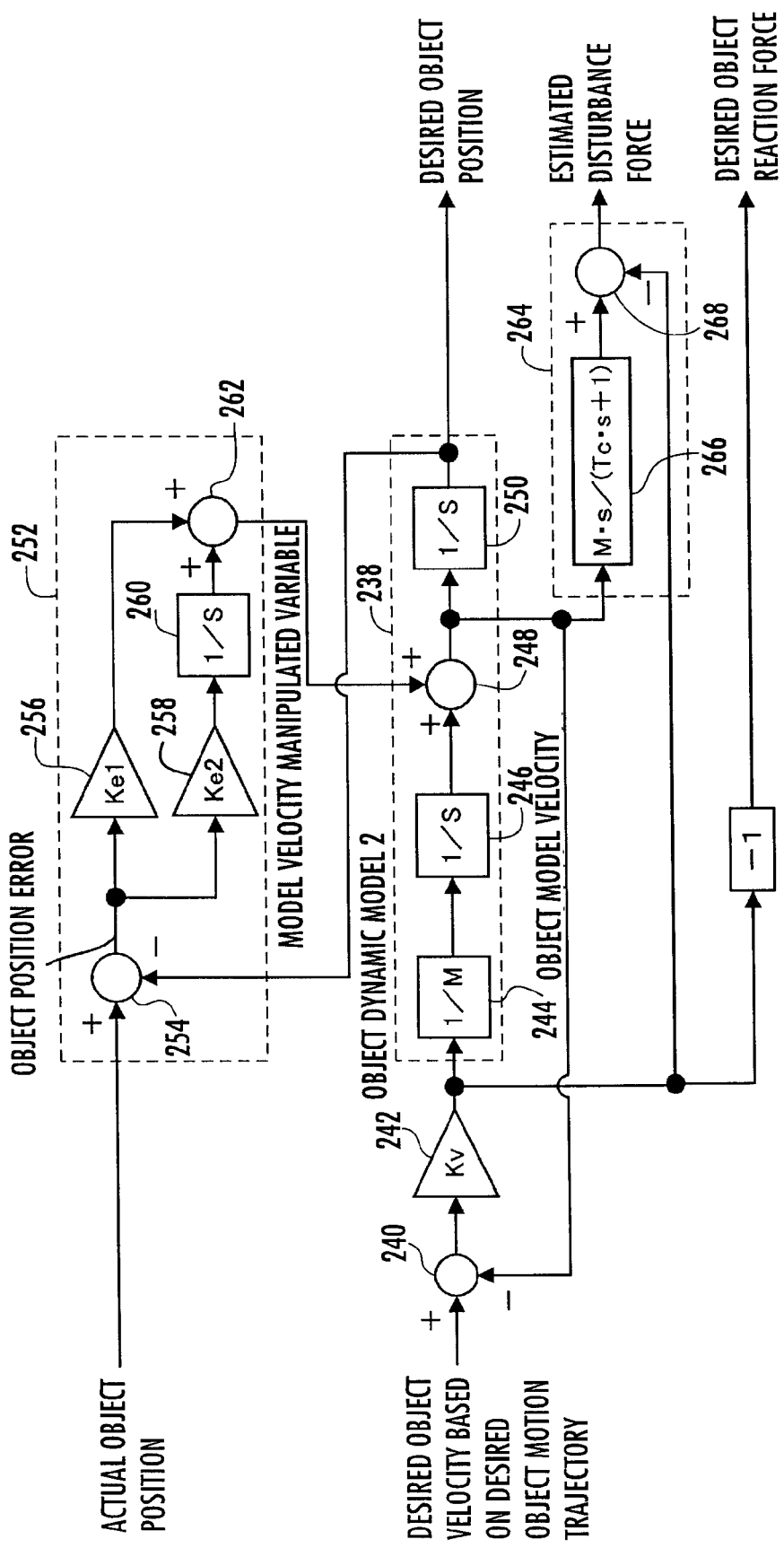
FIG. 17 is a block diagram showing the processing in S35 of FIG. 7.
Figure 18A:
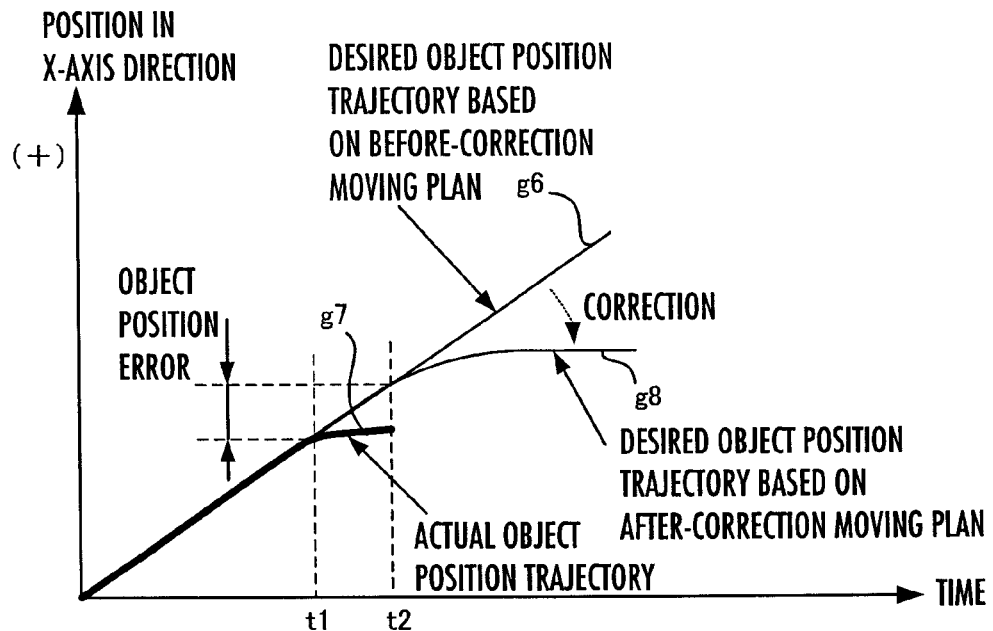
FIGS. 18($a$) and ($b$) are diagrams for explaining the processing for correcting a moving plan in S01 of FIG. 5.
Figure 18B:
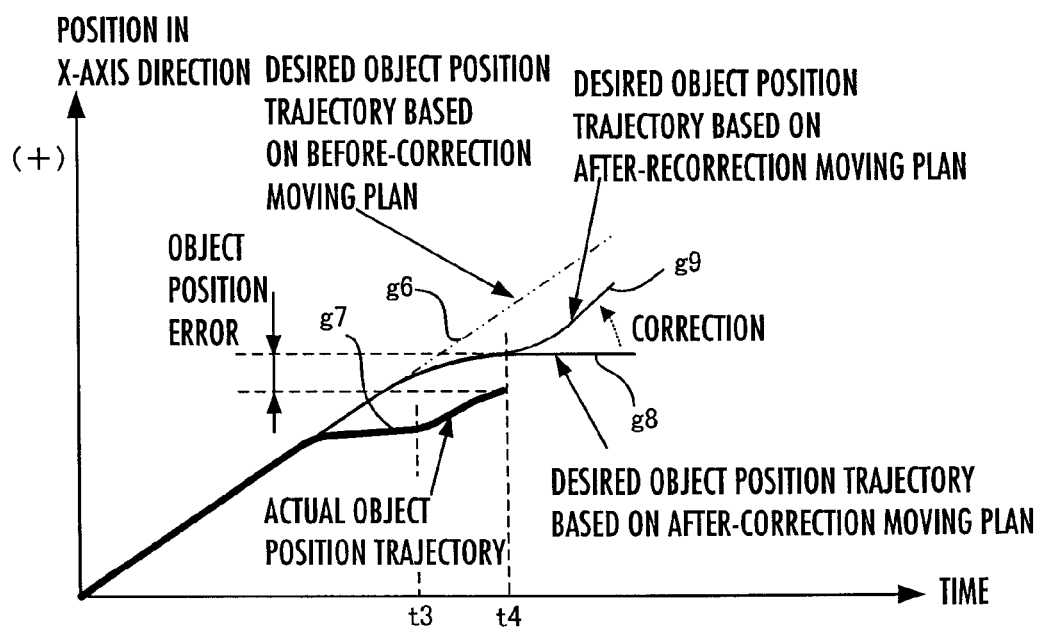
Figure 19:
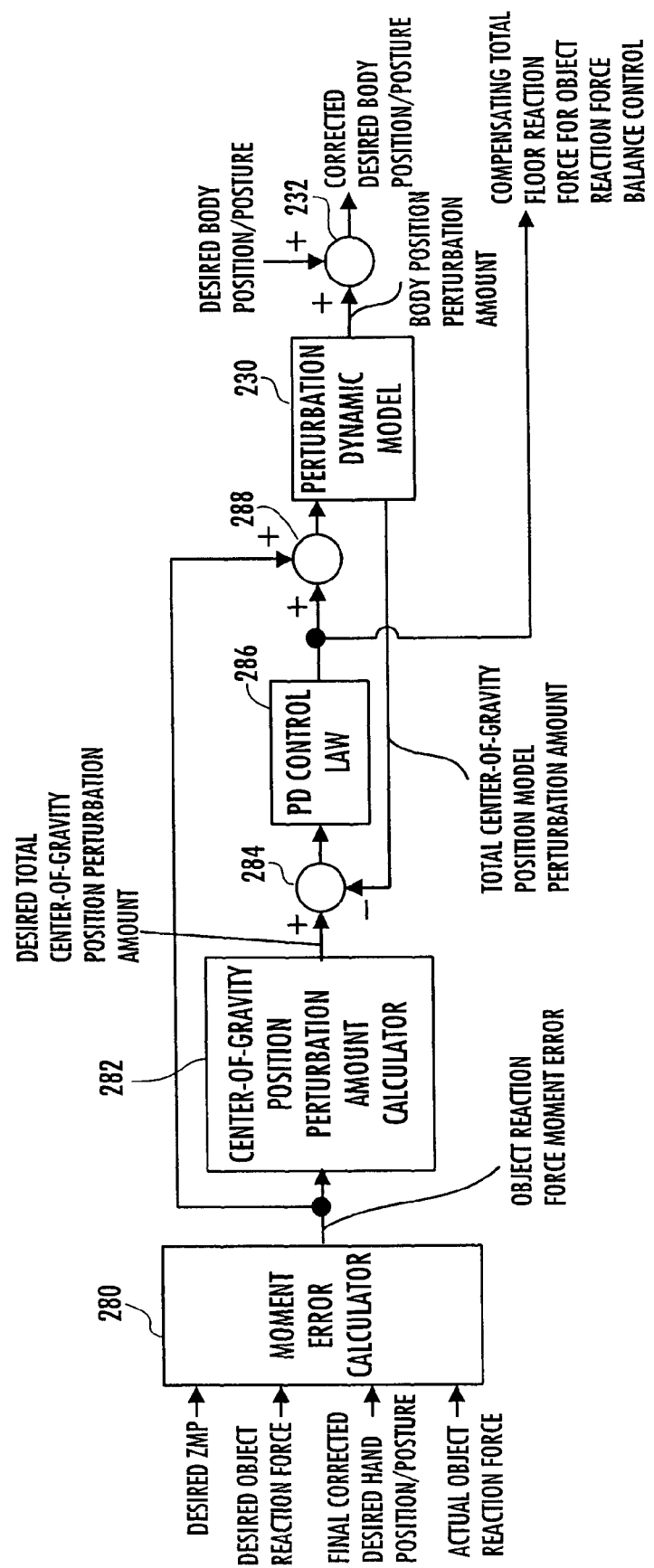
FIG. 19 is a block diagram showing the processing by an object reaction force balance controller shown in FIG. 3.
Figure 20A:
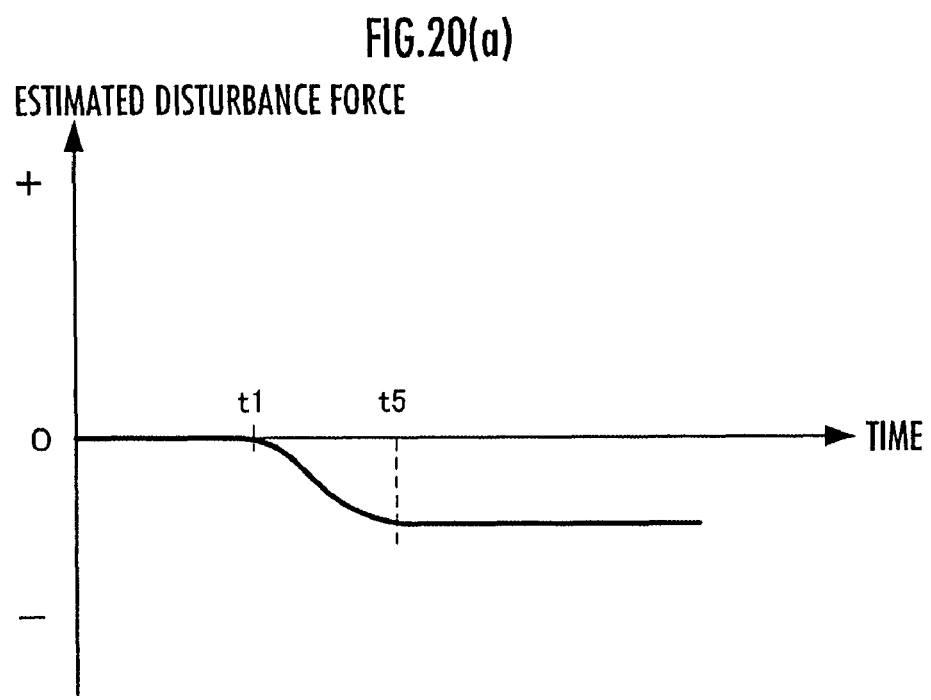
FIG. 20 is a diagram for explaining the processing for correcting a moving plan in S01 (FIG. 5) in a second embodiment of the present invention.
Figure 20B:
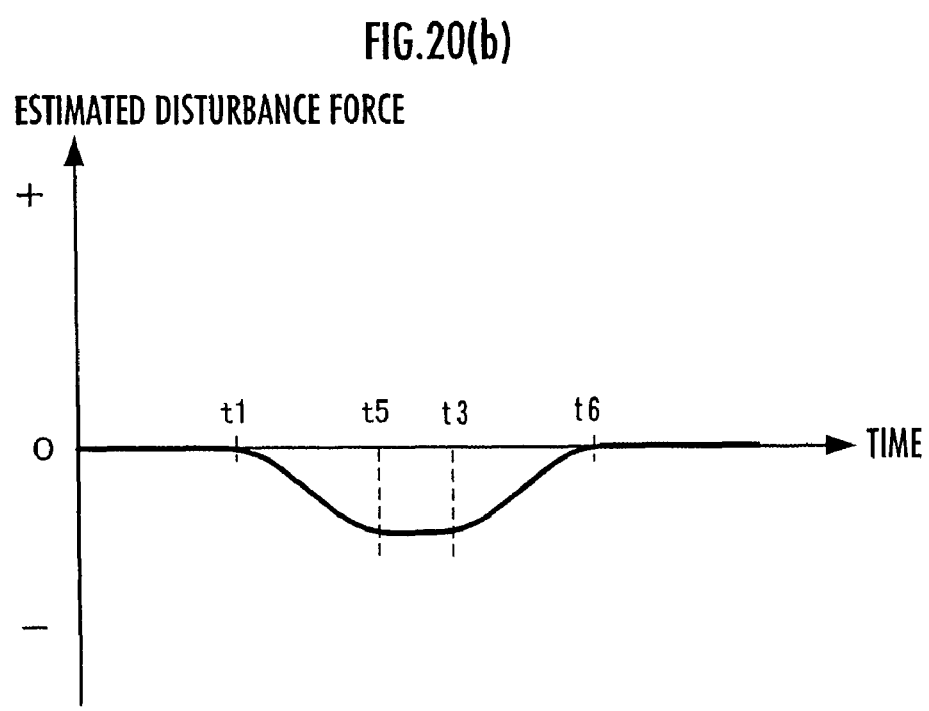

The invention claimed is:

1. A controller of a leg type moving robot for causing the leg type moving robot equipped with a plurality of legs extended from a body thereof to perform an operation of moving an object, the controller comprising:
   a desired motion state amount determining means which sequentially determines a desired motion state amount, which is a desired value of a motion state amount of an object on an object dynamic model showing a relationship between a force acting on the object and a motion of the object, on the basis of at least a moving plan of the object;
   a desired action force determining means which sequentially determines a desired action force between the robot and the object, which is a desired value of a force acting between the robot and the object, such that the motion state amount of the object on the object dynamic model follows at least the determined desired motion state amount;
   a desired moving position determining means which sequentially determines a desired moving position of the object as an output of the dynamic model by inputting the determined desired action force between the robot and the object into the object dynamic model;

a controlling means which controls an operation of the robot on the basis of at least the determined desired action force between the robot and the object and the determined desired moving position;

an actual moving position grasping means which grasps an actual moving position, which is a real moving position of the object; and a motion manipulated variable determining means which determines a motion manipulated variable of an object on the object dynamic model on the basis of a difference between the grasped actual moving position and the determined desired moving position such that the difference approximates zero, wherein the desired moving position determining means determines the desired moving position while correcting the motion state amount of the object on the object dynamic model on the basis of the determined motion manipulated variable.

2. The controller of a leg type moving robot according to claim 1, comprising: a disturbance force estimating means which sequentially estimates a disturbance force other than a force acting on the object from the robot in a force acting on the object; and a moving plan correcting means which corrects the moving plan on the basis of a change in the estimated disturbance force.

3. The controller of a leg type moving robot according to claim 1, comprising: a disturbance force estimating means which sequentially estimates a disturbance force other than a force acting on the object from the robot in a force acting on the object, wherein the desired motion state amount determining means determines the desired motion state amount on the basis of at least the moving plan and the estimated disturbance force.

4. The controller of a leg type moving robot according to claim 2, wherein the disturbance force estimating means is a means for estimating the disturbance force on the basis of the determined desired action force between the robot and the object and the moving velocity of the object on the object dynamic model.

5. The controller of a leg type moving robot according to claim 3, wherein the disturbance force estimating means is a means for estimating the disturbance force on the basis of the determined desired action force between the robot and the object and the moving velocity of the object on the object dynamic model.

* * * * *